(12) United States Patent
Wu

(10) Patent No.: US 10,587,728 B2
(45) Date of Patent: Mar. 10, 2020

(54) METHOD, APPARATUS AND NON-TRANSITORY COMPUTER STORAGE MEDIUM FOR MIGRATING APPLICATION DATA BETWEEN TERMINALS

(71) Applicant: Tencent Technology (Shenzhen) Company Limited, Shenzhen, Guangdong (CN)

(72) Inventor: Jianghong Wu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 15/498,271

(22) Filed: Apr. 26, 2017

(65) Prior Publication Data

US 2017/0230481 A1    Aug. 10, 2017

Related U.S. Application Data

(63) Continuation of application No. PCT/CN2015/093325, filed on Oct. 30, 2015.

(30) Foreign Application Priority Data

Oct. 31, 2014   (CN) .......................... 2014 1 0608206

(51) Int. Cl.
*H04L 29/08* (2006.01)
*G06F 9/48* (2006.01)
(Continued)

(52) U.S. Cl.
CPC ............ *H04L 67/34* (2013.01); *G06F 9/4856* (2013.01); *H04L 61/1582* (2013.01); *H04L 67/1097* (2013.01); *H04W 4/50* (2018.02)

(58) Field of Classification Search
CPC . H04L 67/34; H04L 61/1582; H04L 67/1097; H04W 4/50; G06F 9/4856
See application file for complete search history.

(56) References Cited

U.S. PATENT DOCUMENTS 7,664,786 B2    2/2010  Oh et al.
8,359,290 B1    1/2013  Muthusrinivasan
(Continued)

FOREIGN PATENT DOCUMENTS

CN        102298537 A      12/2011
CN        103092702 A       5/2013
(Continued)

OTHER PUBLICATIONS

Office Action regarding South Korean Patent Application No. 10-2017-7014607, dated Mar. 15, 2018. Translation provided by Unitalen Attorneys at Law.
(Continued)

*Primary Examiner* — Angela Nguyen
(74) *Attorney, Agent, or Firm* — Brinks Gilson & Lione

(57) ABSTRACT

A method, an apparatus and a system for migrating application data between terminals are provided. The method includes steps that: the application runs on a first terminal device; a first terminal receives a migration instruction, and acquires resource data of a first state of the application running on the first terminal device, where the first state is a state of the application from starting to receiving the migration instruction; the resource data is stored according to a predetermined storage address; a second terminal device is determined as a migration destination of the resource data, where the second terminal device is provided with the application; and the storage address of the resource data is sent to the second terminal device, so that the second (Continued)

terminal device acquires the resource data by visiting the storage address, and loads the resource data.

17 Claims, 12 Drawing Sheets

(51) Int. Cl.
*H04W 4/50* (2018.01)
*H04L 29/12* (2006.01)

(56) References Cited

U.S. PATENT DOCUMENTS

| | | | |
|---|---|---|---|
| RE45,729 E | 10/2015 | Oh et al. | |
| 2007/0124775 A1* | 5/2007 | DaCosta | H04N 7/17318 |
| | | | 725/62 |
| 2007/0136392 A1* | 6/2007 | Oh | G06F 9/44505 |
| 2011/0105029 A1 | 5/2011 | Takayashiki et al. | |
| 2012/0208592 A1* | 8/2012 | Davis | H04N 5/235 |
| | | | 455/556.1 |
| 2013/0124675 A1 | 5/2013 | Mo et al. | |
| 2014/0179440 A1* | 6/2014 | Perry | A63F 13/803 |
| | | | 463/42 |
| 2015/0111643 A1* | 4/2015 | Olofsson | A63F 13/335 |
| | | | 463/31 |

FOREIGN PATENT DOCUMENTS

| | | |
|---|---|---|
| CN | 103793270 A | 5/2014 |
| CN | 103825917 A | 5/2014 |
| JP | H05233492 A | 9/1993 |
| JP | H06266663 A | 9/1994 |
| JP | 2005332160 A | 12/2005 |
| JP | 2011118884 A | 6/2011 |
| KR | 20070062395 A | 6/2007 |
| WO | WO-2009011040 A1 | 1/2009 |

OTHER PUBLICATIONS

International Search Report and Written Opinion of the ISA for PCT/CN2015/093325, Haidian District, Beijing, dated Jan. 27, 2016.

Office Action regarding Japanese Patent Application No. 2017-522485, dated May 28, 2018. Translation provided by Unitalen Attorneys at Law.

Chinese Office Action with concise English Translation, issued in Chinese Application No. 201410608206.2, dated Aug. 29, 2019, pp. 1-12.

* cited by examiner

First terminal device 90    Second terminal device 92

METHOD, APPARATUS AND NON-TRANSITORY COMPUTER STORAGE MEDIUM FOR MIGRATING APPLICATION DATA BETWEEN TERMINALS

The present application is a continuation of International Patent Application No. PCT/CN2015/093325 filed on Oct. 30, 2015, which claims priority to Chinese Patent Application No. 201410608206.2, titled "METHOD, APPARATUS AND SYSTEM FOR MIGRATING APPLICATION DATA BETWEEN TERMINALS", filed on Oct. 31, 2014 with the State Intellectual Property Office of the People's Republic of China, both of which are incorporated by reference in their entireties herein.

TECHNICAL FIELD

The present disclosure relates to the fields of computer and Internet, and in particular, to a method, an apparatus and a system for migrating application data between terminals.

BACKGROUND

With the rapid development of computer and Internet technologies, Internet-based social applications have emerged, such as interactive games, micro-blogs, WeChat, Weishi and Paint. A social application is a platform that provides instant interaction for users. For example, for two terminals configured with the same application, after two users log in with login accounts on their terminals respectively, the two users can operate the applications on their terminals respectively.

In view of this, the demand for interaction between terminals increases with the development of mobile Internet at present. In most situations, if a terminal needs collaboration with a user of another terminal while running an application, a request is usually transmitted to the other terminal manually. And then the other terminal transmits data obtained after the collaboration to the terminal, thereby achieving interaction between the two terminals running the same application.

For example, in a case that an application installed on mobile terminals is an interactive application, and a user of one mobile terminal needs help from a friend when the interactive application of the mobile terminal reaches a level during the operation of the interactive application, in a conventional method the friend sends a strategy to the above mobile terminal. The user of the mobile terminal needs to first open the strategy to read, and then continue to run the interactive application based on the read content of the strategy. Apparently, the efficiency and effect of the interaction are poor.

At present, there is no effective solution to the above problem in the conventional technology that the efficiency of collaboration between terminal devices is poor when sharing application resource between the terminal devices.

SUMMARY

A method, an apparatus and a system for migrating application data between terminals are provided according to an embodiment of the present disclosure, so as to solve a technical problem in the conventional technology that the efficiency of collaboration between terminal devices is poor when sharing application resources between the terminal devices.

A method for migrating application data between terminals is provided according to an aspect of an embodiment of the present disclosure, which includes: running an application on a first terminal device; receiving by the first terminal a migration instruction, and obtaining resource data of a first state of the application running on the first terminal device, where the first state is a state of the application during a period from startup to an instant when the migration instruction is received; storing the resource data at a predetermined storage address; determining a second terminal device as a destination for migration of the resource data, where the second terminal device is configured with the application; and transmitting the storage address of the resource data to the second terminal device, where the second terminal device obtains the resource data by accessing the storage address and loads the resource data.

An apparatus for migrating application data between terminals is further provided according to another aspect of the embodiment of the present disclosure, which is applied to a first terminal device. The apparatus includes: a processor and one or more modules stored on a memory and executable by the processor. The one or more modules includes: a running module, configured to run an application on the first terminal device; a first obtaining module, configured to receive a migration instruction, and obtain resource data of a first state of the application running on the first terminal device, where the first state is a state of the application during a period from startup to an instant when the migration instruction is received; a first storing module, configured to store the resource data at a predetermined storage address; a determining module, configure to determine a second terminal device as a destination for migration of the resource data, where the second terminal device is configured with the application; and a first migrating module, configured to transmit the storage address of the resource data to the second terminal device, where the second terminal device obtains the resource data by accessing the storage address and loads the resource data.

A non-transitory computer storage medium is further provided according to another aspect of the embodiment of the present disclosure, including a computer executable instruction adapted to perform a method for migrating application data between terminals. The method for migrating application data between terminals includes: running an application on a first terminal device; receiving by the first terminal a migration instruction, and obtaining resource data of a first state of the application running on the first terminal device, where the first state is a state of the application during a period from startup to an instant when the migration instruction is received; storing the resource data at a predetermined storage address; determining a second terminal device as a destination for migration of the resource data, where the second terminal device is configured with the application; and transmitting the storage address of the resource data to the second terminal device, where the second terminal device obtains the resource data by accessing the storage address and loads the resource data.

In the embodiment of the present disclosure, resource data of an application running on a terminal device of a user may be transmitted to a terminal device of a friend of the user, by using the first terminal device to obtain the resource data of operation of the application running on the first terminal device during a period from startup to an instant when the migration instruction is received after the migration instruction is received in the process of running the application; store the resource data at the predetermined storage address; determine the second terminal device as the destination for migration of the resource data; and transmit the storage address of the resource data to the second terminal device, such that the second terminal device obtains the resource data of the application based on the storage address and completes loading of the resource data. Then the terminal device of the friend of the user can run the application based on the above resource data. In this way, the application is shared, and the technical problem in the conventional technology that the efficiency of collaboration between terminal devices is poor when sharing application resources between the terminal devices is solved.

BRIEF DESCRIPTION OF THE DRAWINGS

In order to more clearly illustrate technical solutions in embodiments of the present disclosure, drawings used in the description of the embodiments are introduced briefly hereinafter. Apparently, the drawings described hereinafter only illustrate some embodiments of the present disclosure, and other drawings may be obtained by those skilled in the art based on these drawings without any creative efforts.

DETAILED DESCRIPTION OF THE EMBODIMENTS

Figure 1:
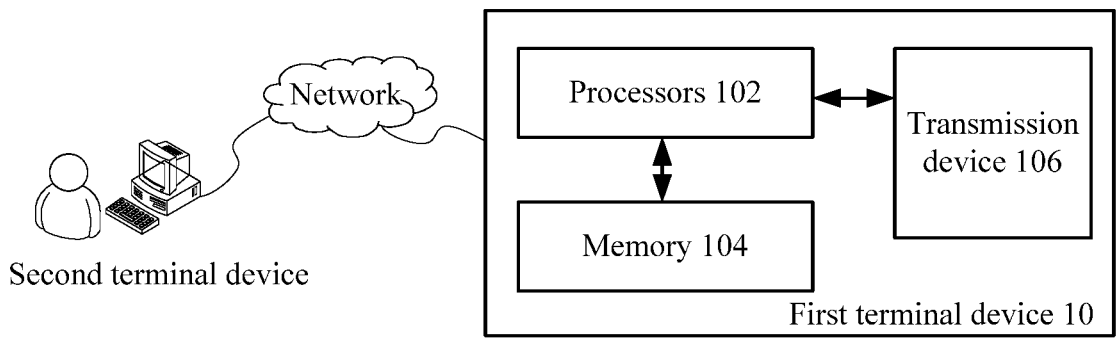
FIG. 1 is a structural block diagram of hardware of a computer terminal for performing a method for migrating application data between terminals according to an embodiment of the present disclosure.

In order to facilitate those skilled in the art to better understand the solutions in the present disclosure, the technical solutions in the embodiments of the present disclosure are described clearly and completely hereinafter in conjunction with the drawings in the embodiments of the present disclosure. Apparently, the described embodiments are only a few of the embodiments of the present disclosure. All other embodiments obtained by those skilled in the art based on the embodiments of the present disclosure without any creative efforts fall within the protection scope of the present disclosure.

It should be noted that terms "first", "second" and the like in the specification, claims and the drawings of the present disclosure are used to differentiate similar objects rather than to describe specific sequences or orders. It should be understood that the terms used in this way are interchangeable under appropriate circumstances such that the embodiments of the present disclosure described herein can be implemented in other sequences in addition to those illustrated or described herein. Moreover, terms such as "include", "have" and any other variants thereof are meant to cover non-exclusive enclosure. For example, process, method, system, product or device including a series of steps or units is not limited to the steps or units that are clearly listed, and optionally includes other steps or units that are not listed or that are inherent in the process, method, product or device.

First Embodiment

A method embodiment for migrating application data between terminals is provided according to an embodiment of the present disclosure. It should be noted that, steps shown in the flow charts in the drawings may be executed in a computer system such as a set of computer executable instructions. In addition, although logical sequences are shown in the flow charts, the shown or described steps may be performed in other sequences different from those described herein in some situations.

The method embodiment according to the first embodiment of the present disclosure may be implemented on an arithmetical device such as a mobile terminal, a computer terminal or the like. Taking operating on a computer terminal device as an example, FIG. 1 is a structural block diagram of hardware of a computer terminal for performing a method for migrating application data between terminals according to an embodiment of the present disclosure. As shown in FIG. 1, the computer terminal 10 acting as a first terminal device includes one or more (only one is shown in the figure) processors 102, a memory 104 configured to store data and a transmission device 106 for performing a communication function. The processors 102 may include but not limited to a micro controller unit MCU or a field programmable gate Array FPGA. Those skilled in the art can understand that the structure shown in FIG. 1 is for illustration only, and the structure of the above electronic device is not limited hereto. For example, the computer terminal 10 may include more or less components than the components illustrated in FIG. 1, or have a different configuration from FIG. 1.

The memory 104 may be configured to store software programs and modules of applications, such as program instructions/modules corresponding to the method for migrating application data between terminals according to the embodiment of the present disclosure. The processors 102 perform various functional applications and data processing, i.e., implementing the above method for migrating application data between terminals, by running the software programs and modules stored in the memory 104. The memory 104 may include a high speed random access memory, and may also include a non-volatile memory such as one or more magnetic storage devices, a flash memory, or other non-volatile solid-state memory. In some embodiments, the memory 104 may further include memories which are arranged remotely to the processors 102, and the remote memories may be connected to the computer terminal 10 via a network. Examples of the network include but not limited to Internet, intranet, local area network, mobile communication network and combinations thereof.

The transmission device 106 is configured to receive or transmit data via a network. An example of the network may include a wireless network provided by a communication provider of the computer terminal 10. In an example, the transmission device 106 includes a network interface controller (NIC), which may be connected with other network devices via a base station and thereby communicate with the Internet. In an example, the transmission device 106 may be a radio frequency (RF) module configured to communicate with the Internet in a wireless mode.

Figure 2:
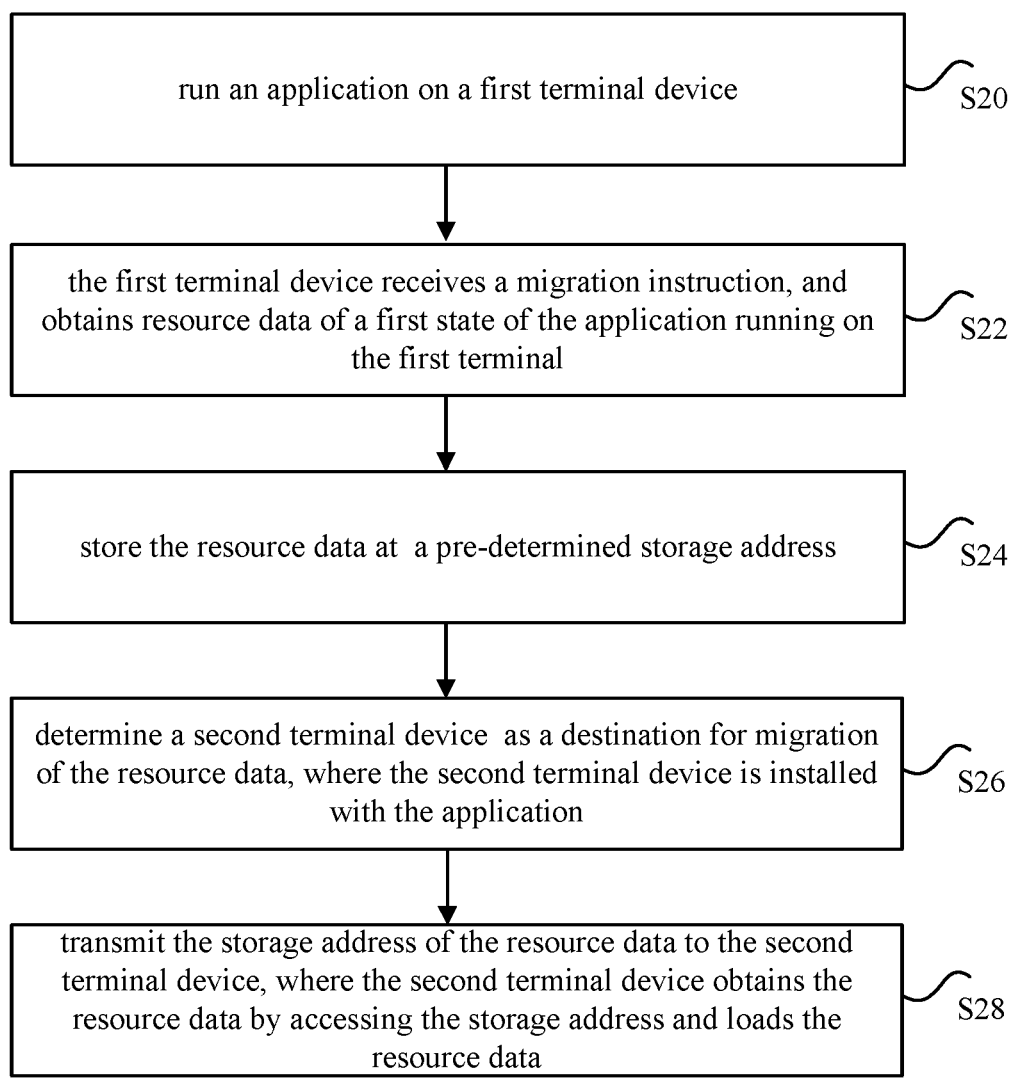
FIG. 2 is a flow chart of a method for migrating application data between terminals according to a first embodiment of the present disclosure.

In the above operating environment, a method for migrating application data between terminals is provided according to the present disclosure, as shown in FIG. 2. FIG. 2 is a flow chart of the method for migrating application data between terminals according to the first embodiment of the present disclosure.

As shown in FIG. 2, the method for migrating application data between terminals may include steps S20 to S28.

In step S20, an application is run on a first terminal device.

It should be noted that, the application in the above solution includes but not limited to a game-type application such as Super Mario™ or Plane Wars. The first terminal device includes but not limited to an intelligent terminal device such as a smart phone or a tablet computer.

In step S22, the first terminal device receives a migration instruction, and obtains resource data of a first state of the application running on the first terminal. The first state is a state of the application during a period from startup to an instant when the migration instruction is received.

In an optional implementation of the above step S22, in process of running the application on the first terminal device, after receiving the migration instruction at a first instant, the first terminal device may obtain the resource data of operation of the application during a period from an instant when the first terminal device starts the application to the first instant.

In the above process of running the application on the first terminal device, a user may send the migration instruction to the first terminal device at the first instant. It should be noted that, the migration instruction may be an instruction generated after a button control displayed on the first terminal device is triggered by the user, or may be an instruction transmitted by a third-party device to the first terminal device. After receiving the migration instruction, the first terminal device obtains the resource data of operation of the application during a period from starting the application to the first instant in response to the migration instruction. The resource data may be scenario data of the application during a period from startup to the first instant.

For example, a user runs the Super Mario™ game on a terminal device. In the process of running the Super Mario™ on the terminal device, the user has a poor game experience. For example, the user feels that the game is too difficult, and wants to ask a friend for help or wants the friend to experience the game. At a first instant, the user may trigger a button control on the terminal device to generate a migration instruction. Upon receiving the migration instruction, the terminal device immediately obtains resource data of the Super Mario™ during a period from startup to the first instant. It should be noted that, the first instant may be a time point at which the Super Mario™ game reaches a stage or a game level. Because of some operations performed by the user in the game, the Super Mario™ game reaches to a progress or a stage. Hence, the resource data may be more than one of the following pieces of data: application of the game itself, scenario data of an n-th level of the Super Mario™ game at the first instant (such as a water scenario or a land scenario) and features of a character controlled by the user (such as a size of the character, with or without an amulet, and with or without a function of firing bullets).

In step S24, the resource data is stored at a predetermined storage address.

The above step S24 according to the present disclosure may be implemented by storing the resource data to a predetermined magnetic disk at the predetermined storage address. The predetermined magnetic disk may be a magnetic disk of the first terminal device itself, or may be a database disk provided by a third-party server. After receiving the migration instruction, the first terminal device may store a resource program of the application in a file format, such as a context file format. It can be seen that the resource data may be stored locally, or stored in the cloud, or stored in a background via a network, or stored in other manners.

In step S26, a second terminal device is determined as a destination for migration of the resource data. The second terminal device is configured with the application. Preferably, a communication relation between the two terminal devices may be established when the migration instruction is received by the first terminal device or before the migration instruction is received by the first terminal device, such that the two terminal devices have the migration relation.

The second terminal device in the above step S24 may be a target terminal device to which the user wants to migrate the application. Still taking the case in which a user runs the Super Mario™ game on a terminal device as an example, in the process of operating the Super Mario™ game, the user feels that the game is too difficult, and wants to ask a friend for help, that is, the user wants the friend to experience the Super Mario™ game and provide a game strategy. While sending a migration instruction to the first terminal device running the Super Mario™ game, the user determines to migrate the Super Mario™ game to the friend of the user, i.e., the second terminal device.

In step S28, the storage address of the resource data is transmitted to the second terminal device, where the second terminal device obtains the resource data by accessing the storage address and loads the resource data. Preferably, the second terminal device may obtain the resource data from the predetermined magnetic disk.

After obtaining the resource data of the application, the second terminal device in the above step S28 may load the resource data to its local application. That is, the second terminal runs the same application as the first terminal device.

Still taking the case in which a user runs the Super Mario™ game on a terminal device as an example, in the process of operating the Super Mario™, the user feels that the game is too difficult, and wants to ask a friend for help, that is, the user wants the friend to experience the Super Mario™ game and provide a game strategy. The user transmits application data of the Super Mario™ game and resource data of the Super Mario™ game at a first instant, such as scenario data of an n-th level of the Super Mario™ game (such as a water scenario or a land scenario) and features of a character controlled by the user (such as a size of the character, with or without an amulet, and with or without a function of firing bullets), to a predetermined magnetic disk via the terminal device. Then the friend of the user, i.e., the second terminal device, may obtain the resource data and load the resource data to its own terminal device.

It can be seen from the above that in the solution according to the first embodiment of the present disclosure, in the process of running the application on the first terminal device, after receiving the migration instruction at the first instant, the first terminal device obtains the resource data of operation of the application during a period from an instant when the first terminal device starts the application to the first instant and stores the resource data at the predetermined storage address. When the migration instruction is received by the first terminal device, the second terminal device having the migration relation with the first terminal device may be determined, such that the second terminal device obtains the resource data based on the storage address of the resource data. With the above solution, resource data of an application running on a terminal device of a user may be transmitted to a terminal device of a friend of the user, and the terminal device of the friend of the user may run the application based on the above resource data. In this way, the application is shared, and a technical problem in the conventional technology that the efficiency of collaboration between terminal devices is poor when sharing application resources between the terminal devices is solved.

Figure 3:
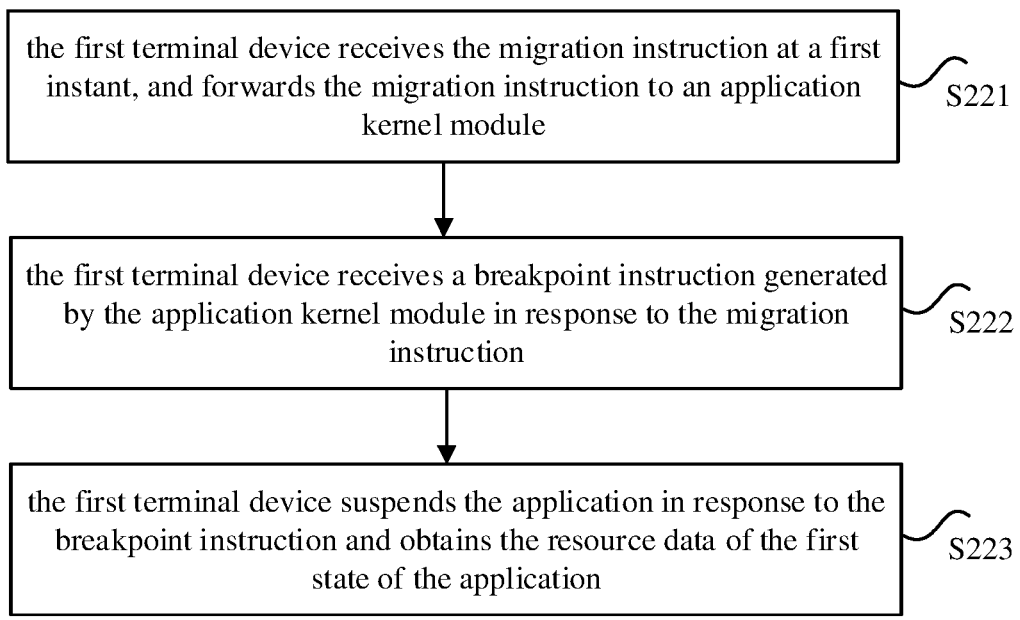
FIG. 3 is a flow chart of a method for migrating application data between terminals according to a first embodiment of the present disclosure.

As shown in FIG. 3, according to an optional solution in the present disclosure, the above step S22 may further include steps S221 to S223.

In step S221, the first terminal device receives the migration instruction at the first instant, and forwards the migration instruction to an application kernel module.

In step S222, the first terminal device receives a breakpoint instruction generated by the application kernel module in response to the migration instruction.

Figure 5:
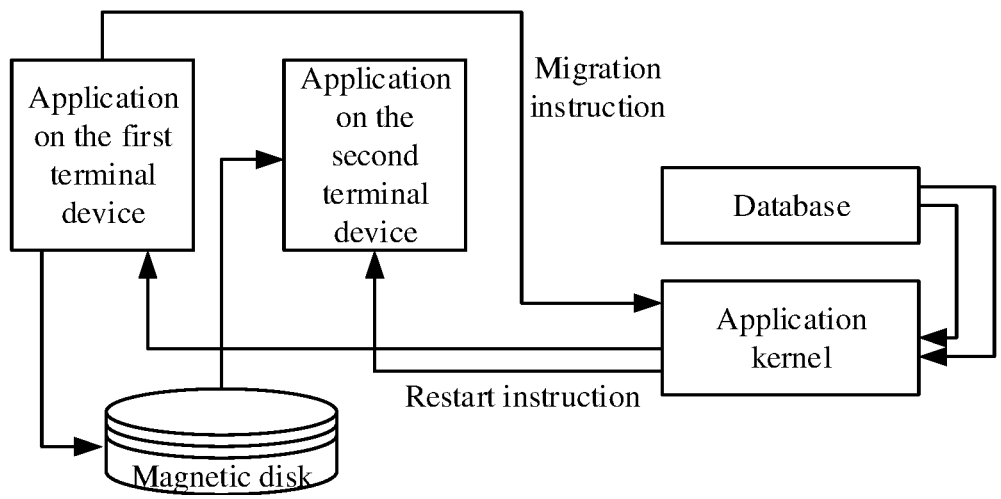
FIG. 5 is a schematic diagram of a method for migrating application data between terminals according to a first embodiment of the present disclosure.

Referring to FIG. 5, the breakpoint instruction in the above step S222 according to the present disclosure may be an instruction generated by the application kernel module in a background of the first terminal device in response to the migration instruction after the migration instruction is received by the first terminal device. Specifically, the application kernel module provides a port for generating the breakpoint instruction. After the migration instruction is received, the breakpoint instruction is generated by invoking a breakpoint function in a BLCR database LIB via the port, and the breakpoint instruction is returned to the first terminal device.

In step S223, the first terminal device suspends the application in response to the breakpoint instruction and obtains the resource data of the first state of the application.

Through the above step S223 according to the present disclosure, after the breakpoint instruction generated by the application kernel module is received by the first terminal device, the breakpoint instruction controls the first terminal device to suspend the currently running application. The suspending time is the first instant. That is, the background is informed that resource data to be synchronized to the second terminal device is the resource data during a period from starting the application by the first terminal device to the first instant. The resource data described herein at least includes: an operating environment, function names of various functions for running the application and names and content of various objects for running the application. The resource data ensures that scenarios and content on the second terminal device are exactly the same as those on the first terminal device after the resource data is loaded by the second terminal.

Still taking the case in which a user runs the Super Mario™ game on a terminal device as an example, the terminal device of the user suspends the running Super Mario™ game in response to a received breakpoint instruction from an application kernel, and further performs a step of obtaining resource data of operation of the Super Mario™ game during a period from an instant when the terminal device of the user starts the Super Mario™ game to the first instant, such as scenario data of an n-th level of the Super Mario™ game (such as a water scenario or a land scenario) and features of a character controlled by the user (such as a size of the character, with or without an amulet, and with or without a function of firing bullets).

Figure 4:
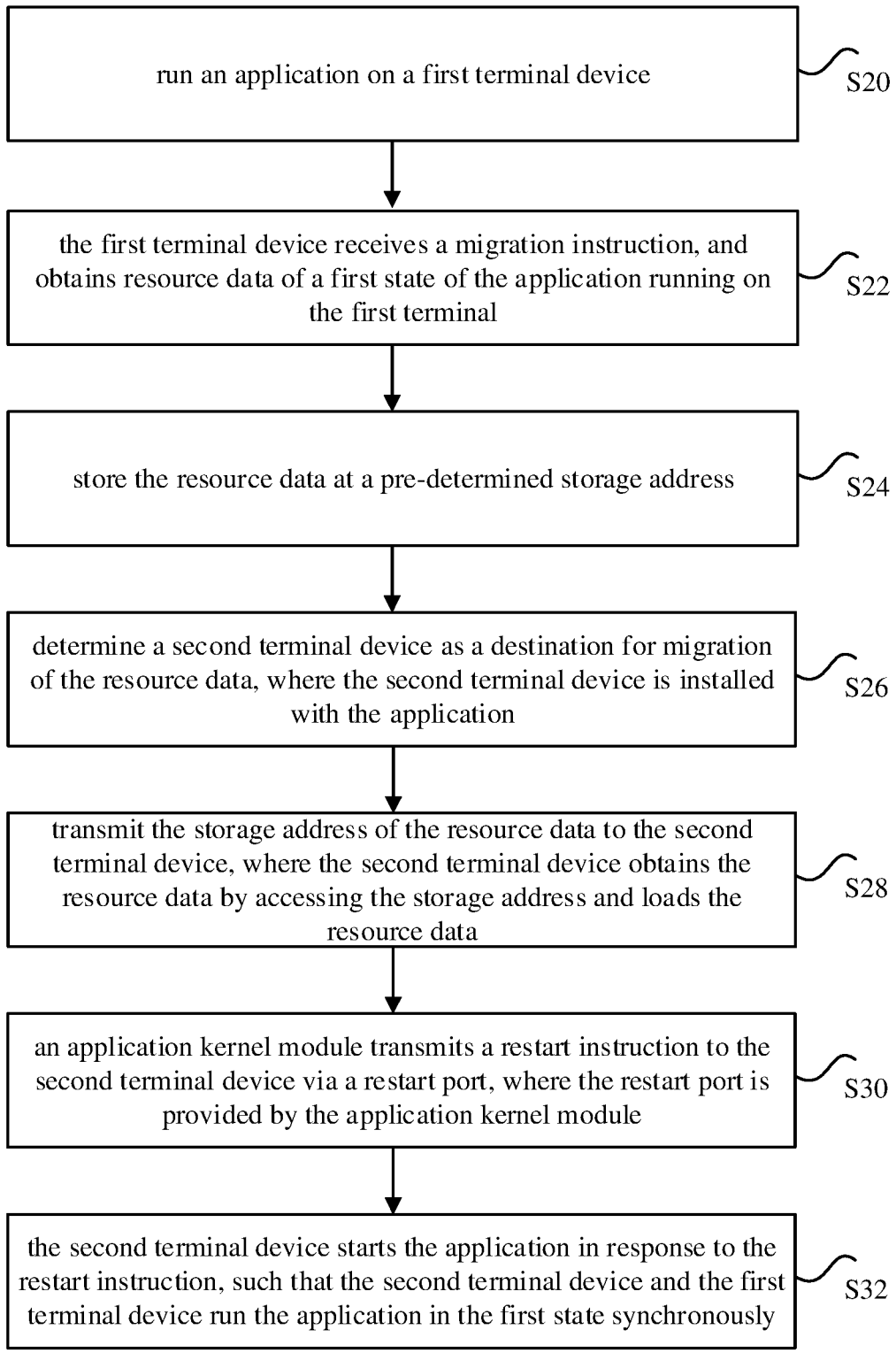
FIG. 4 is a flow chart of a method for migrating application data between terminals according to a first embodiment of the present disclosure.

As shown in FIG. 4, according to another optional solution in the present disclosure, after the step S28, the method for migrating application data between terminals may further include the following steps S30 and S32.

In step S30, an application kernel module transmits a restart instruction to the second terminal device via a restart interface. The restart interface is provided by the application kernel module.

Referring to FIG. 5, the restart instruction in the above step S30 according to the present disclosure may be an instruction provided by the application kernel module in a background of the second terminal device after the resource data is obtained by the second terminal device from the predetermined storage address. The restart instruction is used to control the second terminal device to start the application and load the obtained resource data to the currently running application. Specifically, the application kernel module provides a port for generating the restart instruction. After a restart instruction is received, the restart instruction is generated by invoking a restart function and a load function in a database LIB via the port.

Taking the case in which a user runs the Super Mario™ game on a terminal device as an example, a terminal device of a friend of the user, i.e., the second terminal device described above, receives the restart instruction transmitted by an application kernel module, via a restart interface provided by the application kernel module, after receiving data of the game at a first instant which is obtained by the terminal device of the user by operating the Super Mario™ game.

In step S32, the second terminal device starts the application in response to the restart instruction, such that the second terminal device and the first terminal device run the application in the first state synchronously.

Still taking the case in which a user runs the Super Mario™ game on a terminal device as an example, a terminal device of a friend of a user, i.e., the second terminal device described above, may start the obtained Super Mario™ game in response to the restart instruction. It should be noted that, since the resource data of operation of the Super Mario™ game during a period from an instant when the terminal device of the user starts the Super Mario™ game to a first instant, such as scenario data of an n-th level of the Super Mario™ game (such as a water scenario or a land scenario) and features of a character controlled by the user (such as a size of the character, with or without an amulet, and with or without a function of firing bullets), is obtained by the second terminal device, the second terminal device and the first terminal device may run the Super Mario™ game synchronously from the first instant. That is, when the Super Mario™ game runs on the second terminal device, data such as the game process, scenarios and features of the game character, is exactly the same as that in the Super Mario™ game running on the first terminal device, thereby achieving game synchronization.

Figure 6:
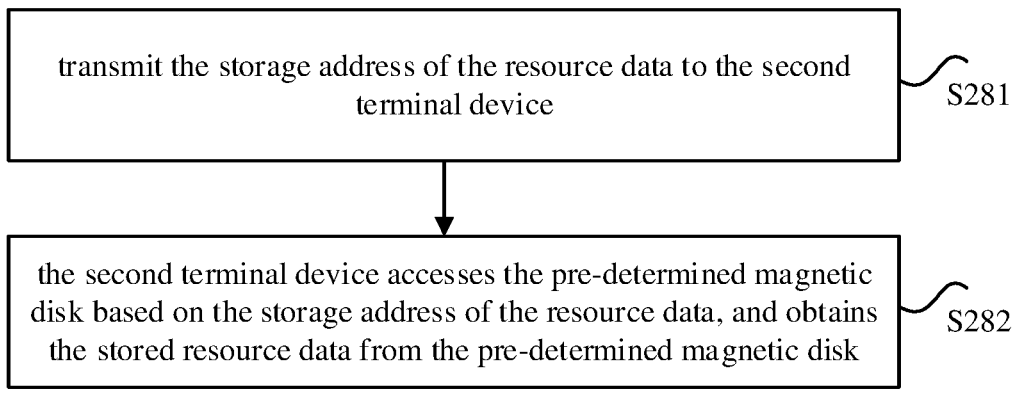
FIG. 6 is a flow chart of a method for migrating application data between terminals according to a first embodiment of the present disclosure.

As shown in FIG. 6, according to another optional solution in the present disclosure, the step S28 further includes steps S281 to S282.

In step S281, the storage address of the resource data is transmitted to the second terminal device.

The storage address of the resource data in the above step S281 may be an address of a predetermined magnetic disk. The address of the predetermined magnetic disk may be an address of a local disk of the first terminal device or an address of a database disk provided by a third-party server.

In step S282, the second terminal device accesses the predetermined magnetic disk based on the storage address of the resource data, and obtains the stored resource data from the predetermined magnetic disk.

Taking the case in which a user runs the Super Mario™ game on a terminal device as an example, the second terminal device may be a terminal device of a friend of the user. It should be noted that the resource data obtained by the terminal device of the friend of the user from the predetermined magnetic disk may be data generated by the terminal device of the user, i.e., the first terminal device, in a stage of running the Super Mario™ game. That is, the resource data may be the data generated at the first instant, such as scenario data of an n-th level of the Super Mario™ game at the first instant (such as a water scenario or a land scenario) and features of a character controlled by the user (such as a size of the character, with or without an amulet, and with or without a function of firing bullets).

Preferably, in the above steps according to the present disclosure, the address of the predetermined magnetic disk may be transmitted to the second terminal device in at least one of the following transmission: a network communication, a Bluetooth® communication, a near field communication payment and a short message.

Taking the case in which a user runs the Super Mario™ game on a terminal device as an example, after resource data of the Super Mario™ game running on the terminal device of the user is stored to a predetermined magnetic disk, an address of the predetermined magnetic disk may be transmitted to the terminal device of the friend of the user in the following transmission: a network communication, a Bluetooth® communication, a near field communication payment and a short message. The terminal device of the friend of the user may obtain the resource data based on the address of the predetermined magnetic disk.

For example, in a case that a WIFI communication is adopted, the first terminal device may obtain an access address of the second terminal device by querying via WIFI, and transmit the address of the predetermined magnetic disk for storing the resource data to the second terminal device based on the access address of the second terminal device.

Figure 7:
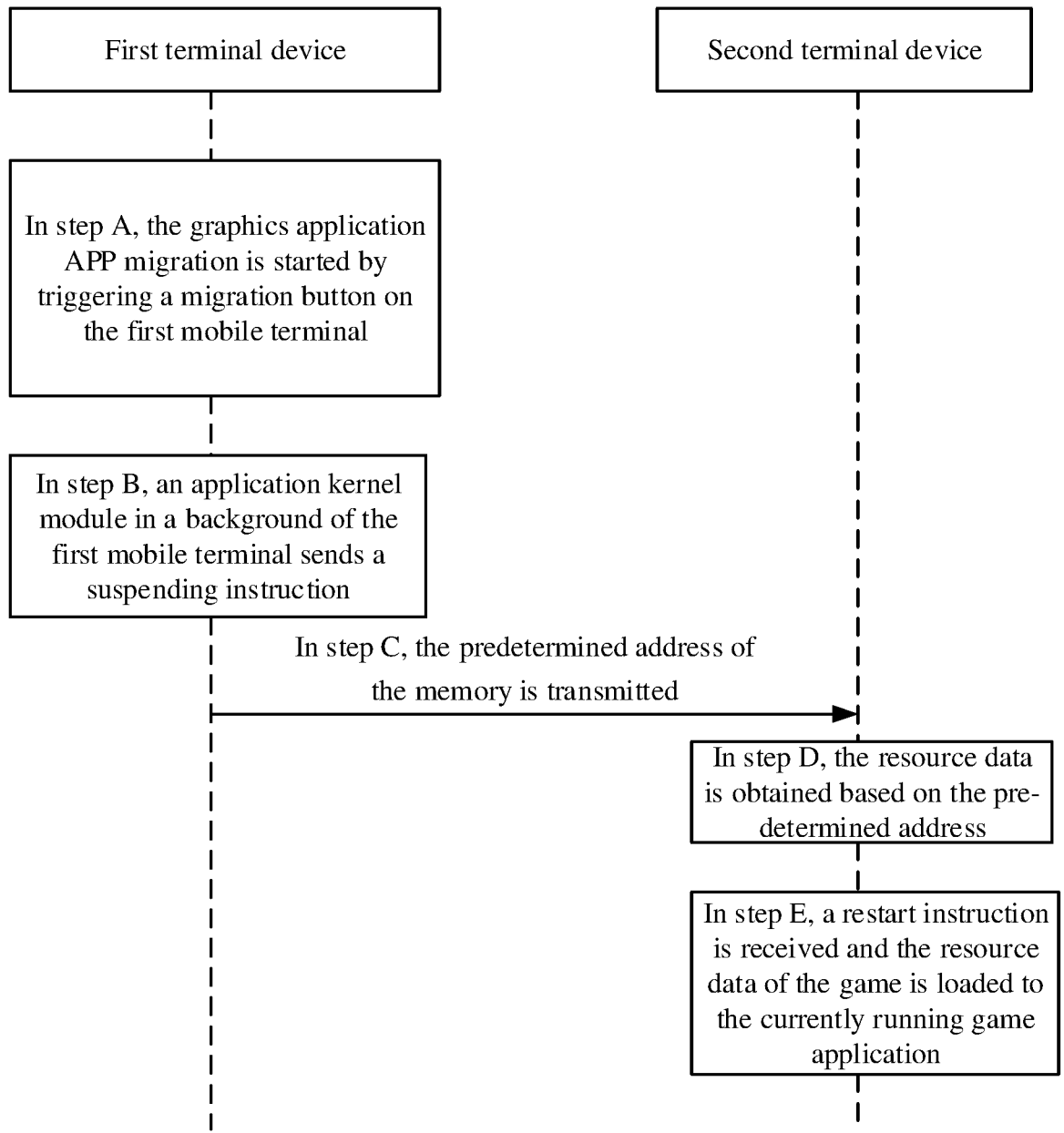
FIG. 7 is a schematic diagram of a method for migrating application data between terminals according to a first embodiment of the present disclosure.

In conclusion, referring to FIG. 7, the application according to the first embodiment of the present disclosure may be a client application of a game such as Super Mario™ or Plane Wars. The first terminal device and the second terminal device each may be a mobile terminal such as a smart phone or a tablet computer. Functions realized by applying the solution in the present disclosure to three optional application scenarios are described in detail hereinafter.

In step A, a graphics application APP migration technology is applied to a first mobile terminal and a second mobile terminal. After a game client is installed to the first mobile terminal and the second mobile terminal, the graphics application APP migration is started by triggering a migration button on the first mobile terminal, i.e., the game is switched to the second mobile terminal (a mobile phone of a friend) in a process of running on the first mobile terminal, so as to allow the friend to continue to operate the running application.

In step B, after the migration button on the first mobile terminal is triggered at a first instant, an application kernel module in a background of the first mobile terminal sends a suspending instruction, to suspend the game running on the first mobile terminal at the first instant, and resource data of the game before the first instant is stored to a memory at a predetermined address.

In step C, the first mobile terminal transmits the predetermined address of the memory to the second mobile terminal in a communication mode.

In step D, the second mobile terminal obtains the resource data of the game on the first mobile terminal, which is before the first instant, based on the predetermined address of the memory.

In step E, after receiving a restart instruction, the second mobile terminal starts the local game application and loads the obtained resource data of the game to the currently running game application, thereby taking over the game from the first mobile terminal.

It can be seen from the above that the solution of steps A to E in the present disclosure may be applied to the following application scenarios, to achieve effective and efficient interaction between terminals.

In a first application, when an APP on the first mobile terminal reaches a stage, a user A may, with the above solution, instantly switch the APP to the second mobile terminal, such as a mobile phone of a user B, to continue to operate the APP from the scenario on the first mobile terminal before switching, thereby taking over an APP on a terminal by the same APP on another terminal.

In a second application, the graphics application APP migration technology is applied to a social game. Specifically, when a user A of the first mobile terminal runs a game APP to a game level, a user B of the second terminal device, such as a mobile phone, may join the game application of the user A of the first mobile terminal instantly with the solution, so that the scenario of the game may continue from the scenario before the time of switching.

Specifically, in an optional solution, a user B can take over a game level of a user A and continue the game.

According to another embodiment of the present disclosure, after the step S32, the method may further include: creating by the second terminal device a new object in the application, such that the second terminal device and the first terminal device run the application in the first state synchronously, where the created new object is controlled by the user of the second terminal device.

In an optional solution, the game can be shared between the two terminals. That is, the second terminal device can not only continue the game of the user B of the first mobile terminal but also feedback a game resource of a user B to the user A in the same manner, thereby playing the game by two game users together. In this way, the user A and the user B can play against each other in a game.

In a third application, the graphics application APP migration technology may also be applied to home devices. Specifically, in a case that a user A of the first mobile terminal experiences an application, such as a game, on a mobile phone, and then wants to switch to a PC machine in the house or a television in the house to continue the game, migration can be completed instantly with the above solution according to the present disclosure.

It should be noted that the above method embodiments are expressed as combinations of a series of actions for simplicity. Those skilled in the art should know that, the present disclosure is not limited to the described sequence of the actions, because some steps may be performed in other sequences or may be performed at the same time according to the present disclosure. Moreover, those skilled in the art should know that the embodiments described in the specification are all preferred embodiments, and actions and modules that are involved are not necessary to the present disclosure.

Based on the descriptions of the above implementations, those skilled in the art can understand that the method according to the above embodiment may be implemented by software and a general hardware platform which is necessary, or by hardware. In most situations, the former is a preferred implementation. Based on this understanding, the essence of the technical solutions or the part of the technical solutions which contributes to the conventional technology, of the present disclosure may be implemented in a form of software product, which is stored in a storage medium (such as a ROM/RAM, a magnetic disk or an optical disk) and includes several instructions to control a terminal device (which may be a mobile phone, a computer, a server or a network device, etc.) to execute the method according to the embodiments of the present disclosure.

Second Embodiment

A device embodiment for implementing the above method embodiment is further provided according to an embodiment of the present disclosure. The apparatus according to the embodiment of the present disclosure may operate in a computer terminal.

Figure 8:
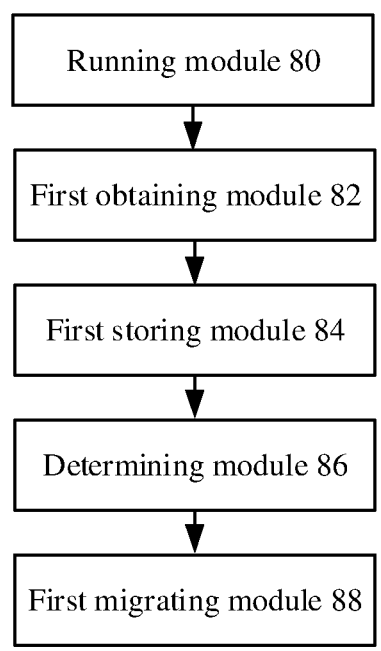
FIG. 8 is a schematic structural diagram of an apparatus for migrating application data between terminals according to a second embodiment of the present disclosure.

FIG. 8 is a schematic structural diagram of an apparatus for migrating application data between terminals according to the second embodiment of the present disclosure.

As shown in FIG. 8, the apparatus for migrating application data between terminals may include: a running module 80, a first obtaining module 82, a first storing module 84, a determining module 86 and a first migrating module 88.

Specifically, the running module 80 is configured to run an application on a first terminal device.

The first obtaining module 82 is configured to receive a migration instruction, and obtain resource data of a first state of the application running on the first terminal device, where the first state is a state of the application during a period from startup to an instant when the migration instruction is received.

The first storing module 84 is configured to store the resource data at a predetermined storage address.

The determining module 86 is configure to determine a second terminal device as a destination for migration of the resource data, where the second terminal device is configured with the application.

The first migrating module 88 is configured to transmit the storage address of the resource data to the second terminal device, where the second terminal device obtains the resource data by accessing the storage address and loads the resource data.

It can be seen from the above that in the solution according to the second embodiment of the present disclosure, in the process of running the application on the first terminal device, after receiving the migration instruction at the first instant, the first terminal device obtains the resource data of operation of the application during a period from an instant when the first terminal device starts the application to the first instant and stores the resource data at the predetermined storage address. When the migration instruction is received by the first terminal device, the second terminal device having a migration relation with the first terminal device may be determined, such that the second terminal device obtains the resource data based on a storage path of the resource data. With the above solution, resource data of an application running on a terminal device of a user may be transmitted to a terminal device of a friend of the user, and the terminal device of the friend of the user may run the application based on the above resource data. In this way, the application is shared, and a technical problem in the conventional technology that the efficiency of collaboration between terminal devices is poor when sharing application resources between the terminal devices is solved.

It should be noted that the running module 80, the first obtaining module 82, the first storing module 84, the determining module 86 and the first migrating module 88 correspond to the steps S20 to S28 in the first embodiment. Examples and application scenarios of the modules are the same as those of the corresponding steps, but are not limited to the content disclosed in the first embodiment. It should be noted that the modules as a part of the apparatus may operate in the computer terminal 10 according to the first embodiment, and may be implemented by software or by hardware.

Figure 9:
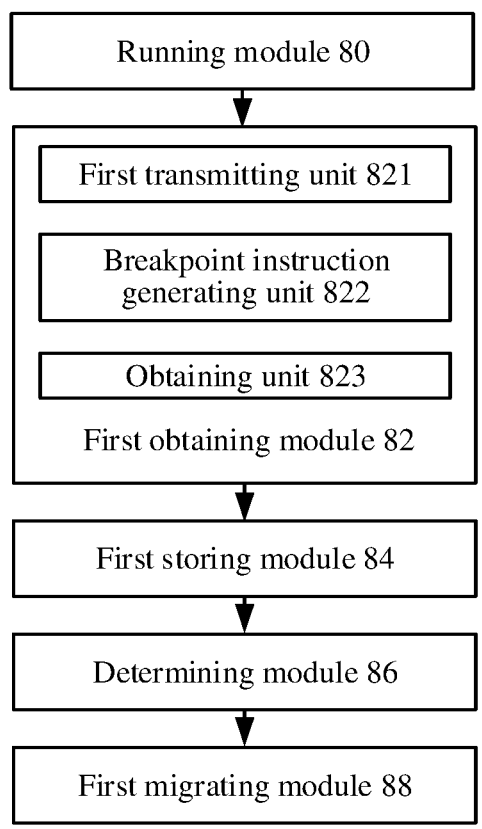
FIG. 9 is a schematic structural diagram of an apparatus for migrating application data between terminals according to a second embodiment of the present disclosure.

Preferably, as shown in FIG. 9, the first obtaining module 82 may further include a first transmitting unit 821, a breakpoint instruction generating unit 822 and an obtaining unit 823.

Specifically, the transmitting unit 821 is configured to receive the migration instruction at the first instant and forward the migration instruction to an application kernel module.

The breakpoint instruction generating unit 822 is configured to receive by the first terminal device a breakpoint instruction generated by the application kernel module in response to the migration instruction.

The obtaining unit 823 is configured to suspend the application in response to the breakpoint instruction and obtain the resource data of the first state of the application.

It should be noted that the first transmitting unit 821, the breakpoint instruction generating unit 822 and the obtaining unit 823 correspond to the steps S221 to S223 in the first embodiment. Examples and application scenarios of the modules are the same as those of the corresponding steps, but are not limited to the content disclosed in the first embodiment. It should be noted that the modules as a part of the apparatus may operate in the computer terminal 10 according to the first embodiment, and may be implemented by software or by hardware.

Figure 10:
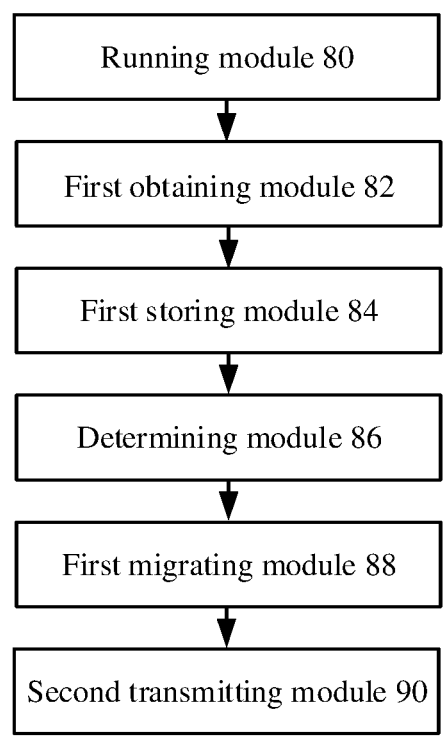
FIG. 10 is a schematic structural diagram of an apparatus for migrating application data between terminals according to a second embodiment of the present disclosure.

Preferably, as shown in FIG. 10, the apparatus for migrating application data between terminals may further include a second transmitting module 90.

Specifically, the second transmitting module 90 is configured to transmit a restart instruction to the second terminal device via a restart interface provided by the application kernel module, and start the application by the second terminal device in response to the restart instruction and load the resource data, such that the second terminal device and the first terminal device run the application in the first state synchronously.

It should be noted that the second transmitting module 90 corresponds to the steps S30 to S32 in the first embodiment. Examples and application scenarios of the module are the same as those of the corresponding steps, but are not limited to the content disclosed in the first embodiment. It should be noted that the module as a part of the apparatus may operate in the computer terminal 10 according to the first embodiment, and may be implemented by software or by hardware.

Figure 11:
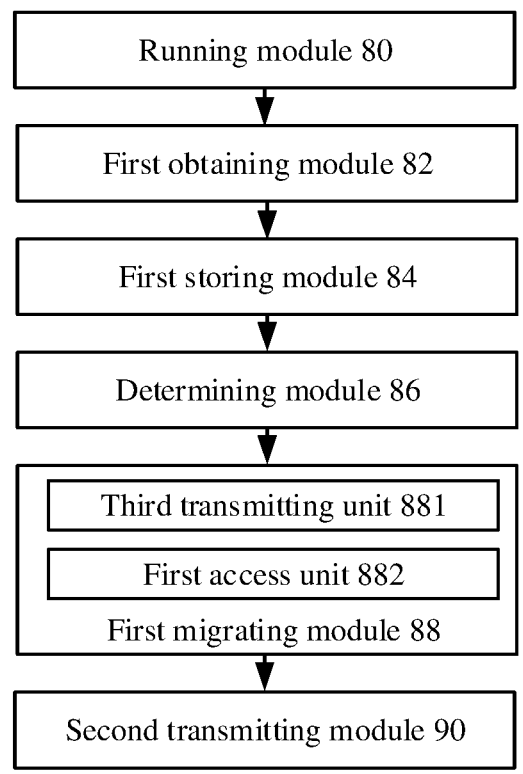
FIG. 11 is a schematic structural diagram of an apparatus for migrating application data between terminals according to a second embodiment of the present disclosure.

In an embodiment, as shown in FIG. 11, the first migrating module 88 may further include a third transmitting unit 881 and a first access unit 882.

Specifically, the third transmitting unit 881 is configured to transmit the predetermined storage address to the second terminal device. The first access unit 882 is configured to access a predetermined magnetic disk based on the predetermined storage address, and obtain the stored resource data from the predetermined magnetic disk.

It should be noted that the third transmitting unit 881 and the first access unit 882 correspond to the steps S281 to S282 in the first embodiment. Examples and application scenarios of the two modules are the same as those of the corresponding steps, but are not limited to the content disclosed in the first embodiment. It should be noted that the modules as a part of the apparatus may operate in the computer terminal 10 according to the first embodiment, and may be implemented by software or by hardware.

Preferable, in the solution according to the second embodiment of the present disclosure, the address of the predetermined magnetic disk may be transmitted to the second terminal device in one or more of the following transmission: a network communication, a Bluetooth® communication, a near field communication payment and a short message.

It can be seen from the above that the solution realized by the above device embodiments of the present disclosure may be applied to the following application scenarios, which can achieve effective and efficient interaction between terminals.

In a first application, when an APP on a first mobile terminal reaches a stage, a user A may, with the above solution, instantly switch the APP to the second mobile terminal, such as a mobile phone, of a user B, to continue to operate the scenario of the APP from the scenario on the first mobile terminal before switching, thereby taking over an APP on a terminal by the same APP on another terminal.

In a second application, a graphics application APP migration technology is applied to a social game. Specifically, when a user A of a first mobile terminal runs a game APP to a game level, a user B of a second terminal device, such as a mobile phone, may join the game application of the user A of the first mobile terminal instantly with the solution, so that the scenario of the game may continue from the scenario before the time of switching.

Specifically, in an optional solution, a game level of a user A may be taken over to continue the game.

According to another embodiment of the present disclosure, after loading the resource data, the second terminal device creates a new object in the application, such that the second terminal device and the first terminal device run the application in the first state synchronously. The created new object is controlled by the user of the second terminal device.

In an optional solution, the game can be shared between the two terminals. That is, the second terminal device can not only continue the game of the user A of the first mobile terminal but also feedback a game resource of a user B to the user A in the same manner, thereby playing the game by two game users together. In this way, the user A and the user B can play against each other in a game.

In a third application, the graphics application APP migration technology may also be applied to home devices. Specifically, in a case that a user A of a first mobile terminal experiences an application, such as a game, on a mobile phone, and then wants to switch to a PC machine in the house or a television in the house to continue the game, migration can be completed instantly with the above solution according to the present disclosure.

Third Embodiment

Figure 12:
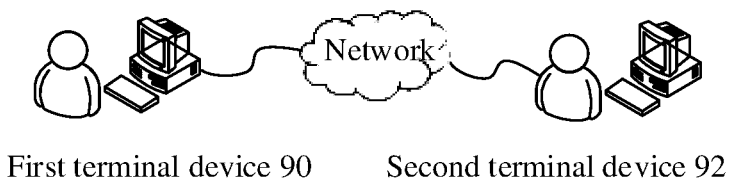
FIG. 12 is a schematic structural diagram of a system for migrating application data between terminals according to a third embodiment of the present disclosure.

A system embodiment for implementing the above device embodiment is further provided according to an embodiment of the present disclosure. FIG. 12 is a schematic structural diagram of a system for migrating application data between terminals according to the third embodiment of the present disclosure.

As shown in FIG. 12, the system for migrating application data between terminals may include a first terminal device 90 and a second terminal device 92.

Specifically, the first terminal device 90 is configured to run an application; receive a migration instruction, and obtain resource data of a first state of the application running on the first terminal device, where the first state is a state of the application during a period from startup to an instant when the migration instruction is received; store the resource data at a predetermined storage address; determine the second terminal device as a destination for migration of the resource data; and transmit the storage address of the resource data to the second terminal device.

The second terminal device 92 is configured with the application and has a communication relation with the first terminal device, and is configured to obtain the resource data by accessing the storage address of the resource data and load the resource data. That is, the second terminal device obtains the resource data based on the storage address of the resource data and loads the resource data to its local application.

It can be seen from the above that in the solution according to the third embodiment of the present disclosure, in the process of running the application on the first terminal device, after receiving the migration instruction at the first instant, the first terminal device obtains the resource data of operation of the application during a period from an instant when the first terminal device starts the application to the first instant and stores the resource data to a predetermined magnetic disk at a predetermined path. When the migration instruction is received by the first terminal device, the second terminal device having a migration relation with the first terminal device is determined, such that the second terminal device obtains the resource data from the predetermined magnetic disk. With the above solution, resource data of an application running on a terminal device of a user may be transmitted to a terminal device of a friend of the user, and the terminal device of the friend of the user may run the application based on the above resource data. In this way, the application is shared, and a technical problem in the conventional technology that the efficiency of collaboration between terminal devices is poor when sharing application resources between the terminal devices is solved.

It should be noted that the application in the system embodiment is not limited to a game-type application such as Super Mario™ or Plane Wars. The first terminal device is not limited to an intelligent terminal device such as a smart phone or a tablet computer. In the process of running the application on the first terminal device, a user may send the migration instruction to the first terminal device at the first instant.

Furthermore, it should be noted that the migration instruction may be an instruction generated after a button control displayed on the first terminal device is triggered by the user, or may be an instruction transmitted by a third-party device to the first terminal device. After receiving the migration instruction, the first terminal device obtains the resource data of operation of the application during a period from starting the application by the first terminal device to the first instant in response to the migration instruction. The resource data may be scenario data of the application during a period from startup to the first instant. The predetermined magnetic disk may be a magnetic disk of the first terminal device itself, or may be a database disk provided by a third-party server. After receiving the migration instruction, the first terminal device may store a resource program of the application in a file format, such as a context file format.

In addition, the second terminal device may be a target terminal device to which the user wants to migrate the application. After obtaining the resource data of the application, the second terminal device may load the resource data to its local application, that is, the second terminal runs the same application as the first terminal device.

Preferably, the system further includes: a memory and a third-party server having a function of an application kernel. The memory may be used to store the resource data. The application kernel may be provided by the first terminal device or the second terminal device, or may be provided by a third-party server.

It should be noted that, the preferred or optional embodiments of this system may have the same implementations or application scenarios as the first embodiment of method, but are not limited to the disclosure of the first embodiment.

In an optional application, before performing the function of obtaining the resource data of operation of the application during a period from an instant when the first terminal device starts the application to the first instant, the first terminal device may receive a breakpoint instruction generated by an application kernel module in a case that it is detected that the migration instruction is received by the first terminal device. In this case, the terminal device may suspend the application in response to the breakpoint instruction and perform the step of obtaining the resource data of operation of the application during a period from an instant when the first terminal device starts the application to the first instant.

It should be noted that in an optional solution of the above system, the breakpoint instruction may be an instruction generated by the application kernel module in a background of the first terminal device in response to the migration instruction after the migration instruction is received by the first terminal device. Specifically, the application kernel module provides a port for generating the breakpoint instruction. After the migration instruction is received, the breakpoint instruction is generated by invoking a breakpoint function in a database LIB via the port, and the breakpoint instruction is returned to the first terminal device.

In addition, after the breakpoint instruction generated by the application kernel module is received by the first terminal device, the breakpoint instruction controls the first terminal device to suspend the currently running application. The suspending time is the first instant. That is, the background is informed that resource data to be synchronized to the second terminal device is the resource data on the first terminal device during a period from starting the application to the first instant. The resource data described herein at least includes: an operating environment, function names of various functions for running the application and names and content of various objects for running the application. The resource data ensures that scenarios and content on the second terminal device are exactly the same as those on the first terminal device after the resource data is loaded by the second terminal.

In another optional solution, in the system embodiment, after the resource data is obtained by the second terminal device, a restart instruction may be transmitted to the second terminal device via the application kernel module. The second terminal device obtains the restart instruction via a restart interface provided by the application kernel module. Then, the second terminal device starts the application loaded with the resource data, in response to the restart instruction, such that the second terminal device and the first terminal device run the application from the first instant synchronously.

It should be noted that the restart instruction may be an instruction provided by an application kernel module in a background of the second terminal device after the resource data is obtained by the second terminal device from the predetermined magnetic disk. The restart instruction is used to control the second terminal device to start the application and load the obtained resource data to the currently running application. Specifically, the application kernel module provides a port for generating the restart instruction. After a restart instruction is received, the restart instruction is generated by invoking a restart function and a load function in a database LIB via the port.

Furthermore, it should be noted that, since resource data of operation of the application during a period from an instant when the terminal device of the user starts the application to a first instant, such as scenario data of an n-th level of the Super Mario™ game (such as a water scenario or a land scenario) and features of a character controlled by the user (such as a size of the character, with or without an amulet, and with or without a function of firing bullets), is obtained by the second terminal device, the second terminal device and the first terminal device may run the Super Mario™ game synchronously from the first instant. That is, when the Super Mario™ game runs on the second terminal device, data such as the game process, scenarios and features of the game character, is exactly the same as that in the Super Mario™ game running on the first terminal device, thereby achieving game synchronization.

In another optional solution, after the second terminal device having the migration relation with the first terminal device is determined by the system, the address of the predetermined magnetic disk may be transmitted to the second terminal device. Then the second terminal device accesses the predetermined magnetic disk based on the address of the predetermined magnetic disk, and obtains the stored resource data from the predetermined magnetic disk.

Preferably, the system may transmit the address of the predetermined magnetic disk to the second terminal device in at least one of the following transmission: a network communication, a Bluetooth® communication, a near field communication payment and a short message. For example, in a case that a WIFI communication is adopted, the first terminal device may obtain an access address of the second terminal device by querying via WIFI, and transmit the address of the predetermined magnetic disk for storing the resource data to the second terminal device based on the access address of the second terminal device.

Fourth Embodiment

A method embodiment for migrating application data between terminals is provided according to an embodiment of the present disclosure. It should be noted that, steps shown in the flow charts in the drawings may be executed in a computer system such as a set of computer executable instructions. In addition, although logical sequences are shown in the flow charts, the shown or described steps may be performed in other sequences different from those described herein in some situations.

The method embodiment according to the fourth embodiment of the present disclosure may be implemented on an arithmetical device such as a mobile terminal, a computer terminal or the like. It should be noted that the method embodiment according to the fourth embodiment of the present disclosure may be implemented on the computer terminal shown in FIG. 1.

Figure 13:
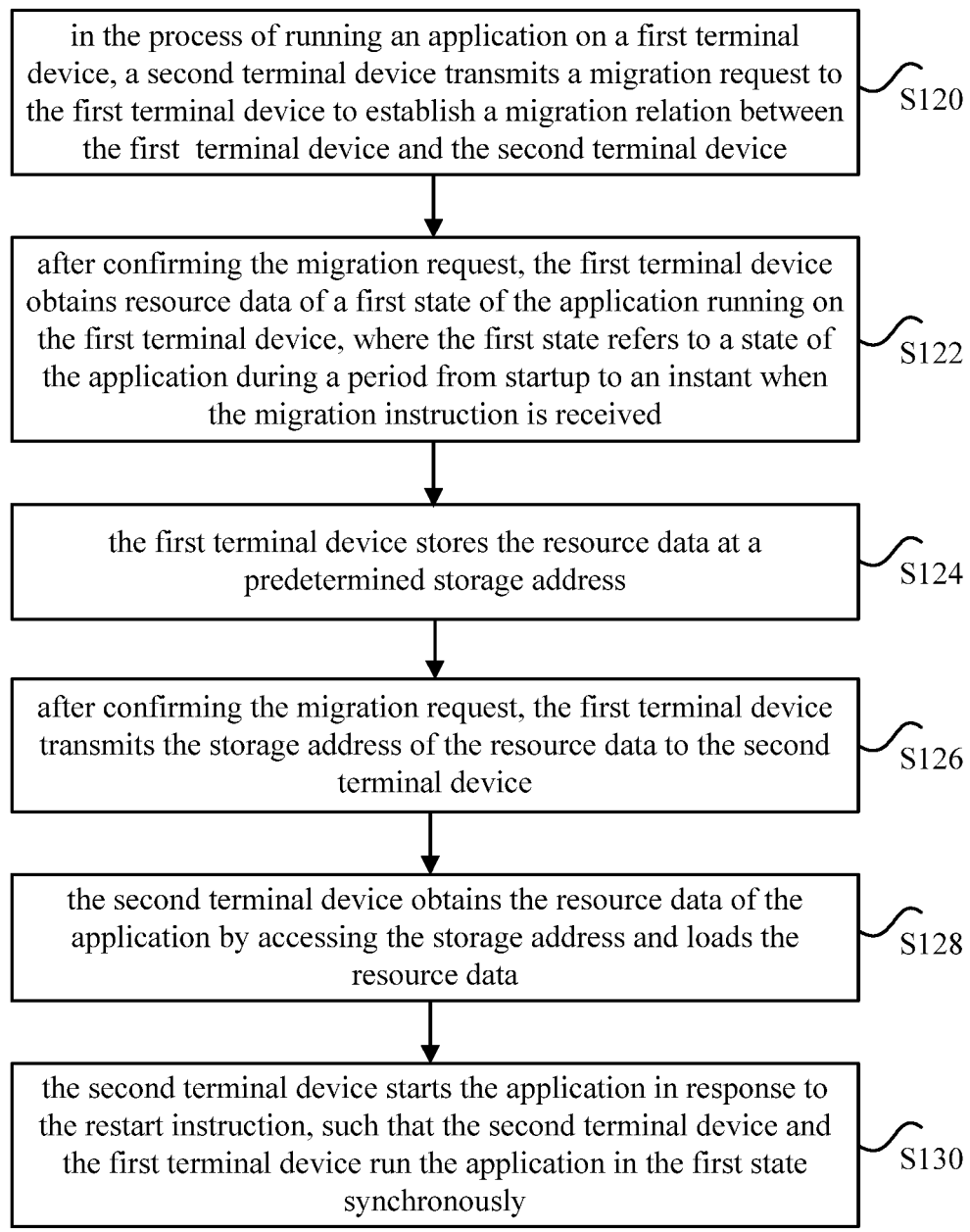
FIG. 13 is a flow chart of a method for migrating application data between terminals according to a fourth embodiment of the present disclosure.

In the above operating environment as an example, a method for migrating application data between terminals is provided according to the present disclosure, as shown in FIG. 13. FIG. 13 is a flow chart of the method for migrating application data between terminals according to the fourth embodiment of the present disclosure.

As shown in FIG. 13, the method for migrating application data between terminals may include steps S120 to S130.

In step 120, in the process of running an application on a first terminal device, a second terminal device transmits a migration request to the first terminal device to establish a migration relation between the first terminal device and the second terminal device.

Preferably, a communication relation between the two terminal devices may be established when a migration instruction is received by the first terminal device or before the migration instruction is received by the first terminal device, to build the migration relation between the two terminal devices.

The application in the above step S120 according to the present disclosure is not limited to a game-type application such as Super Mario™ or Plane Wars. The first terminal device or the second terminal device is not limited to an intelligent terminal device such as a smart phone or a tablet computer. In the process of running the application on the first terminal device, the second terminal device may transmit the migration request to the first terminal device, such that the first terminal device and the second terminal device have the migration relation.

For example, a user runs the Super Mario™ game on a terminal device. In the process of running the Super Mario™ on the terminal device, a friend of the user wants to experience the game, or the user feels that the game is too difficult and wants the friend to experience the game and provide a game strategy. A terminal device of the friend of the user, i.e., the second terminal device, may transmit a migration request to the terminal device of the user, i.e., the first terminal device. In this way, a migration relation is established between the terminal device of the user and the terminal device of the friend of the user.

In step S122, after confirming the migration request, the first terminal device obtains resource data of a first state of the application running on the first terminal device. The first state is a state of the application during a period from startup to an instant when the migration instruction is received.

In the above step S122 according to the present disclosure, after receiving the migration request transmitted by the second terminal device, the first terminal device may obtain the resource data of the first terminal device during a period from starting the application to an instant when the migration request is received, in response to the migration request. The resource data may be scenario data in the first state.

Still taking the case in which a user runs the Super Mario™ game on a terminal device as an example, upon receiving the migration request, the terminal device of the user may immediately obtain resource data of the Super Mario™ during a period from startup to an instant when the migration request is received by the terminal device of the user. It should be noted that, for the period from starting the Super Mario™ game to the instant when the migration request is received by the terminal device of the user, the instant when the migration request is received by the terminal device of the user may be a time point at which the Super Mario™ game reaches a stage or a game level. Because of some operations performed by the user in the game, the Super Mario™ game reaches to a progress or a stage. Hence, when the migration request is received by the terminal device of the user, the resource data may be more than one of the following pieces of data: application of the game itself, scenario data of an n-th level of the Super Mario™ game at the instant when the migration request is received by the terminal device of the user (such as a water scenario or a land scenario) and features of a character controlled by the user (such as a size of the character, with or without an amulet, and with or without a function of firing bullets).

In step S124, the first terminal device stores the resource data at a predetermined storage address.

The above step S124 according to the present disclosure may be implemented as storing the resource data to a predetermined magnetic disk at the predetermined storage address. The predetermined magnetic disk may be a magnetic disk of the first terminal device itself, or may be a database disk provided by a third-party server. After receiving the migration instruction, the first terminal device may store a resource program of the application in a file format, such as a context file format. It can be seen that the resource data may be stored locally, or stored in the cloud, or stored in a background via a network, or stored in other manners.

In step S126, after confirming the migration request, the first terminal device transmits the storage address of the resource data to the second terminal device.

After obtaining the resource data of the application, the second terminal device in the above step S126 may load the resource data to its local application. That is, the second terminal also has the first state of the application.

Still taking the case in which a user runs the Super Mario™ game on a terminal device as an example, in the process of operating the Super Mario™, a friend of the user may also want to experience the Super Mario™ game, or the user feels the game is too difficult and wants the friend to experience the Super Mario™ game and provide a game strategy. The user transmits application data of the Super Mario™ game and resource data of the Super Mario™ game at an instant when a migration request transmitted by a terminal device of the friend of the user is received, such as scenario data of an n-th level of the Super Mario™ game (such as a water scenario or a land scenario) and features of a character controlled by the user (such as a size of the character, with or without an amulet, and with or without a function of firing bullets), to a predetermined magnetic disk via the terminal device. The friend of the user, i.e., the second terminal device, may obtain the resource data and load the resource data to its own terminal device.

In step S128, the second terminal device obtains the resource data of the application by accessing the storage address and loads the resource data. That is, after obtaining the resource data, the second terminal device may load the resource data to its local application. Preferably, the second terminal device may obtain the resource data from the predetermined magnetic disk.

It can be seen from the above that in the solution according to the fourth embodiment of the present disclosure, in the process of running the application on the first terminal device, the second terminal device transmits the migration request to the first terminal device, such that the first terminal device and the second terminal device has the migration relation. After the migration request is confirmed by the first terminal device, the resource data of operation of the application during a period from starting the application to an instant when the migration request is received is obtained and the resource data is stored at a predetermined storage path. After the migration request is confirmed by the first terminal device, the storage address of the resource data is transmitted to the second terminal device, such that the second terminal device obtains the resource data. Then the second terminal device loads the resource data to its local application. With the above solution, resource data of an application running on a terminal device of a user may be transmitted to a terminal device of a friend of the user, and the terminal device of the friend of the user may run the application based on the above resource data. In this way, the application is shared, and a technical problem in the conventional technology that the efficiency of collaboration between terminal devices is poor when sharing application resources between the terminal devices is solved.

In an optional solution according to the present disclosure, the above step S122 may further include the following steps.

The first terminal device receives the migration instruction at a first instant, and forwards the migration instruction to an application kernel module.

The first terminal device receives a breakpoint instruction generated by the application kernel module in response to the migration instruction.

The first terminal device suspends the application in response to the breakpoint instruction and obtains the resource data of the first state of the application.

Referring to FIG. 5, the breakpoint instruction may be an instruction generated by the application kernel module in a background of the first terminal device in response to the migration request after the migration request is received by the first terminal device. Specifically, the application kernel module provides a port for generating the breakpoint instruction. After the migration request is received, the breakpoint instruction is generated by invoking a breakpoint function in a database LIB via the port, and the breakpoint instruction is returned to the first terminal device.

After the breakpoint instruction generated by the application kernel module is received by the first terminal device, the breakpoint instruction controls the first terminal device to suspend the currently running application. The suspending time is an instant when the migration request transmitted by the second terminal device is received by the first terminal device. That is, the background is informed that resource data to be synchronized to the second terminal device is the resource data during a period from starting the application by the first terminal device to an instant when the migration request is received. The resource data described herein at least includes: an operating environment, function names of various functions for running the application and names and content of various objects for running the application. The resource data ensures that scenarios and content on the second terminal device are exactly the same as those on the first terminal device after the resource data is loaded by the second terminal.

Still taking the case in which a user runs the Super Mario™ game on a terminal device as an example, the terminal device of the user suspends the running Super Mario™ game in response to a received breakpoint instruction from an application kernel, and further performs a step of obtaining resource data of operation of the Super Mario™ game during a period from an instant when the terminal device of the user starts the Super Mario™ game to an instant when the migration request is received by the terminal device of the user, such as scenario data of an n-th level of the Super Mario™ game (such as a water scenario or a land scenario) and features of a character controlled by the user (such as a size of the character, with or without an amulet, and with or without a function of firing bullets).

In another optional solution according to the present disclosure, after the step S126, the method for migrating application data between terminals may further perform the following steps.

In step S128, the application kernel module transmits a restart instruction to the second terminal device. The second terminal device obtains the restart instruction via a restart interface provided by the application kernel module.

Referring to FIG. 5, the restart instruction in the above step S128 according to the present disclosure may be an instruction provided by an application kernel module in a background of the second terminal device after the resource data is obtained by the second terminal device from the predetermined storage address. The restart instruction is used to control the second terminal device to start the application and load the obtained resource data to the currently running application. Specifically, the application kernel module provides a port for generating the restart instruction. After a restart instruction is received, the restart instruction is generated by invoking a restart function and a load function in a database LIB via the port.

Taking the case in which a user runs the Super Mario™ game on a terminal device as an example, a terminal device of a friend of a user, i.e., the second terminal device described above, receives a restart instruction transmitted by an application kernel module, via a restart interface provided by the application kernel module, after receiving data of the game at an instant when the migration request is received by the terminal device of the user, which is obtained by the terminal device of the user by operating the Super Mario™ game.

In step S130, the second terminal device starts the application in response to the restart instruction, such that the second terminal device and the first terminal device run the application in the first state synchronously.

Taking the case in which a user runs the Super Mario™ game on a terminal device as an example, a terminal device of a friend of a user, i.e., the second terminal device described above, may start the obtained Super Mario™ game in response to the restart instruction. It should be noted that, since resource data of operation of the Super Mario™ game during a period from an instant when the terminal device of the user starts the Super Mario™ game to an instant when the migration request is received, such as scenario data of an n-th level of the Super Mario™ game at an instant when the migration request is received (such as a water scenario or a land scenario) and features of a character controlled by the user (such as a size of the character, with or without an amulet, and with or without a function of firing bullets), is obtained by the second terminal device, the second terminal device and the first terminal device may run the Super Mario™ game synchronously from an instant when the migration request is received. That is, when the Super Mario™ game runs on the second terminal device, data such as the game process, scenarios and features of the game character, is exactly the same as that in the Super Mario™ game running on the first terminal device, thereby achieving game synchronization.

In another optional solution according to the present disclosure, the step S126 may further include the following steps.

The storage address of the resource data is transmitted to the second terminal device, where the storage address may be an address of a predetermined magnetic disk.

The second terminal device accesses the predetermined magnetic disk based on the storage address of the resource data, and obtains the stored resource data from the predetermined magnetic disk.

The address of the predetermined magnetic disk may be an address of a local disk of the first terminal device or an address of a database disk provided by a third-party server.

Taking the case in which a user runs the Super Mario™ game on a terminal device as an example, the second terminal device may be a terminal device of a friend of the user. It should be noted that the resource data obtained by the terminal device of the friend of the user from the predetermined magnetic disk may be data generated by the terminal device of the user, i.e., the first terminal device, in a stage of running the Super Mario™ game. That is, the resource data may be the data at an instant when the migration request is received by the terminal device of the user, such as scenario data of an n-th level of the Super Mario™ game at an instant when the migration request is received by the terminal device of the user (such as a water scenario or a land scenario) and features of a character controlled by the user (such as a size of the character, with or without an amulet, and with or without a function of firing bullets)

Preferably, in the above steps according to the present disclosure, the address of the predetermined magnetic disk may be transmitted to the second terminal device in at least one of the following transmission: a network communication, a Bluetooth® communication, a near field communication payment and a short message.

Taking the case in which a user runs the Super Mario™ game on a terminal device as an example, after resource data of the Super Mario™ game running on the terminal device of the user is stored to a predetermined magnetic disk, an address of the predetermined magnetic disk may be transmitted to a terminal device of a friend of the user in the following transmission: a network communication, a Bluetooth® communication, a near field communication payment and a short message. The terminal device of the friend of the user may obtain the resource data based on the address of the predetermined magnetic disk.

For example, in a case that a WIFI communication is adopted, the first terminal device may obtain an access address of the second terminal device by querying via WIFI, and transmit the address of the predetermined magnetic disk for storing the resource data to the second terminal device based on the access address of the second terminal device.

In conclusion, referring to FIG. 7, the application according to the fourth embodiment of the present disclosure may be a client application of a game such as Super Mario™ or Plane Wars. The first terminal device and the second terminal device each may be a mobile terminal such as a smart phone or a tablet computer. Functions realized by applying the solution in the present disclosure to three optional application scenarios are described in detail hereinafter.

In step A, a graphics application APP migration technology is applied to a first mobile terminal and a second mobile terminal. After a game client is installed to the first mobile terminal and the second mobile terminal, the graphics application APP migration is started by triggering a migration button on the first mobile terminal, i.e., the game is switched to the second mobile terminal (a mobile phone of a friend) in a process of running on the first mobile terminal, so as to allow the friend to continue to operate the running application.

In step B, after a migration request is received, the migration button on the first mobile terminal may be triggered. An application kernel module in a background of the first mobile terminal sends a suspending instruction, to suspend the game running on the first mobile terminal, and resource data of the game before the migration request is received is stored to a memory at a predetermined address.

In step C, the first mobile terminal transmits the predetermined address of the memory to the second mobile terminal in a communication mode.

In step D, the second mobile terminal obtains the resource data of the game on the first mobile terminal, which is before the migration request is received, based on the predetermined address of the memory.

In step E, after receiving a restart instruction, the second mobile terminal starts the local game application and loads the obtained resource data of the game to the currently running game application, thereby taking over the game from the first mobile terminal.

It can be seen from the above that the solution of steps A to E in the present disclosure may be applied to the following application scenarios, to achieve effective and efficient interaction between terminals.

In a first application, when an APP on the first mobile terminal reaches a stage, a user A may, with the above solution, instantly switch the APP to the second mobile terminal, such as a mobile phone, of a user B, to continue to operate the APP from the scenario on the first mobile terminal before switching, thereby taking over an APP on a terminal by the same APP on another terminal.

In a second application, the graphics application APP migration technology is applied to a social game. Specifically, when a user A of the first mobile terminal runs a game APP to a game level, a user B of the second terminal device, such as a mobile phone, may join the game application of the user A of the first mobile terminal instantly with the solution, so that the scenario of the game may continue from the scenario before the time of switching.

Specifically, in an optional solution, a game level of a user A may be taken over to continue the game.

According to another embodiment of the present disclosure, after the step S130, the method may further include: creating by the second terminal device a new object in the application, such that the second terminal device and the first terminal device run the application in the first state synchronously, where the created new object is controlled by the user of the second terminal device.

In an optional solution, the game can be shared between the two terminals. That is, the second terminal device can not only continue the game of the user B of the first mobile terminal but also feedback a game resource of a user B to the user A in the same manner, thereby playing the game by two game users together. In this way, the user A and the user B can play against each other in a game.

In a third application, the graphics application APP migration technology may also be applied to home devices. Specifically, in a case that a user A of the first mobile terminal experiences an application, such as a game, on a mobile phone, and then wants to switch to a PC machine in the house or a television in the house to continue the game, migration can be completed instantly with the above solution according to the present disclosure.

It should be noted that the above method embodiments are expressed as combinations of a series of actions for simplicity. Those skilled in the art should know that, the present disclosure is not limited to the described sequence of the actions, because some steps may be performed in other sequences or may be performed at the same time according to the present disclosure. Moreover, those skilled in the art should know that the embodiments described in the specification are all preferred embodiments, and actions and modules that are involved are not necessary to the present disclosure.

Based on the descriptions of the above implementations, those skilled in the art can understand that the method according to the above embodiment may be implemented by software and a general hardware platform which is necessary, or by hardware. In most situations, the former is a preferred implementation. Based on this understanding, the essence of the technical solutions or the part of the technical solutions which contributes to the conventional technology, of the present disclosure may be implemented in a form of software product, which is stored in a storage medium (such as a ROM/RAM, a magnetic disk or an optical disk) and includes several instructions to control a terminal device (which may be a mobile phone, a computer, a server or a network device, etc.) to execute the method according to the embodiments of the present disclosure.

Fifth Embodiment

A device embodiment for implementing the above method embodiment is further provided according to an embodiment of the present disclosure. The apparatus according to the embodiment of the present disclosure may operate in a computer terminal.

Figure 14:
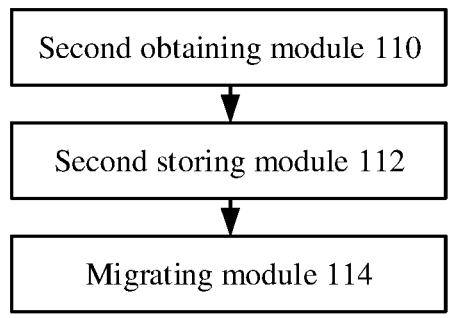
FIG. 14 is a schematic structural diagram of an apparatus for migrating application data between terminals according to a fifth embodiment of the present disclosure.

FIG. 14 is a schematic structural diagram of an apparatus for migrating application data between terminals according to the fifth embodiment of the present disclosure.

As shown in FIG. 14, the apparatus for migrating application data between terminals may include: a second obtaining module 110, a second storing module 112 and a migrating module 114.

The second obtaining module 110 is configured to obtain resource data of a first state of an application running on a first terminal device after a migration request transmitted by a second terminal device is received and confirmed by the first terminal device, in the process of running the application on the first terminal device. The first state is a state of the application during a period from startup to an instant when the migration instruction is received. The second storing module 112 is configured to store the resource data at a predetermined storage address. The migrating module 114 is configured to transmit the storage address of the resource data to the second terminal device after the migration request is confirmed by the first terminal device, such that the second terminal device obtains the resource data of the application by accessing the storage address and loads the resource data.

It should be noted that the second obtaining module 110, the second storing module 112 and the migrating module 114 correspond to the steps S120 to S126 in the fourth embodiment. Examples and application scenarios of the modules are the same as those of the corresponding steps, but are not limited to the content disclosed in the fourth embodiment. It should be noted that the modules as a part of the apparatus may operate in the computer terminal 10 according to the fourth embodiment, and may be implemented by software or by hardware.

Figure 15:
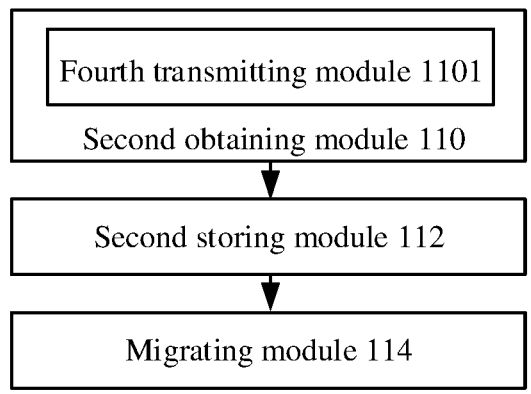
FIG. 15 is a schematic structural diagram of an apparatus for migrating application data between terminals according to a fifth embodiment of the present disclosure.

Preferably, as shown in FIG. 15, the second obtaining module 110 may further include: a fourth transmitting module 1101.

The fourth transmitting module 1101 is configured to transmit a breakpoint instruction generated by an application kernel module to the first terminal device in a case that it is detected that the migration request is confirmed by the first terminal device. The first terminal device suspends the application in response to the breakpoint instruction and performs the step of obtaining the resource data of operation of the application during a period from an instant when the first terminal device starts the application to the first instant.

It should be noted that the fourth transmitting module 1101 corresponds to specific steps in the fourth embodiment. Examples and application scenarios of the module are the same as those of the corresponding steps, but are not limited to the content disclosed in the fourth embodiment. It should be noted that the module as a part of the apparatus may operate in the computer terminal 10 according to the fourth embodiment, and may be implemented by software or by hardware.

Figure 16:
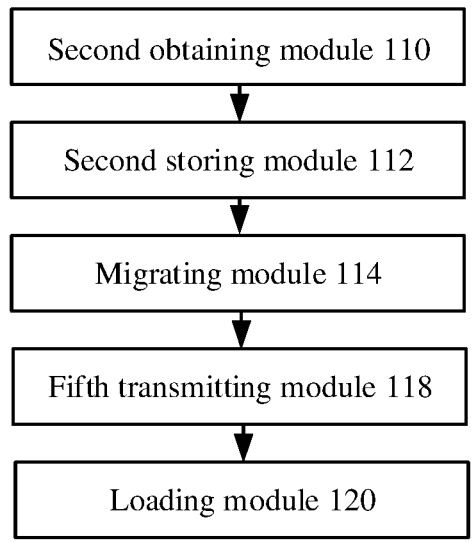
FIG. 16 is a schematic structural diagram of an apparatus for migrating application data between terminals according to a fifth embodiment of the present disclosure.

Preferably, as shown in FIG. 16, the apparatus for migrating application data between terminals may further include: a fifth transmitting module 118 and a loading module 120.

Specifically, the fifth transmitting module 118 is configured to transmit a restart instruction to the second terminal device. The second terminal device obtains the restart instruction via a restart interface provided by the application kernel module.

The loading module 120 is configured to load the resource data to the application in response to the restart instruction, such that the second terminal device and the first terminal device run the application in the first state synchronously.

It should be noted that the fifth transmitting module 118 and the loading module 120 correspond to the steps S128 to S130 in the fourth embodiment. Examples and application scenarios of the modules are the same as those of the corresponding steps, but are not limited to the content disclosed in the fourth embodiment. It should be noted that the modules as a part of the apparatus may operate in the computer terminal 10 according to the fourth embodiment, and may be implemented by software or by hardware.

Figure 17:
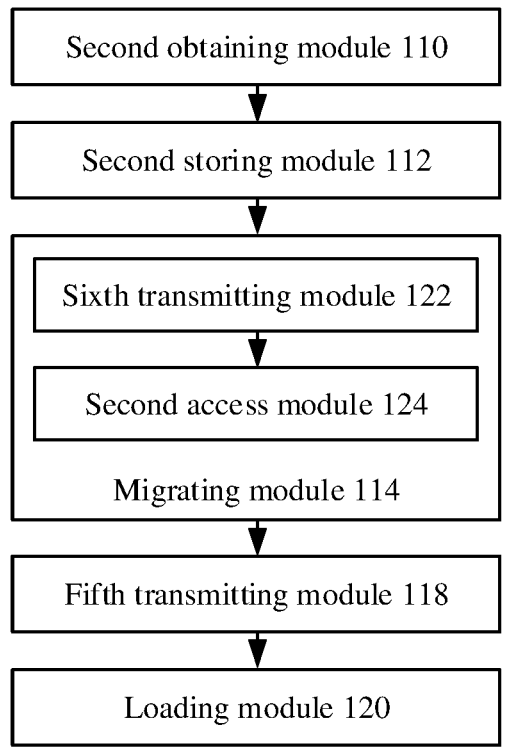
FIG. 17 is a schematic structural diagram of an apparatus for migrating application data between terminals according to a fifth embodiment of the present disclosure.

Preferably, as shown in FIG. 17, the migrating module 114 in the apparatus for migrating application data between terminals may further include: a sixth transmitting module 122 and a second access module 124.

The sixth transmitting module 122 is configured to transmit the predetermined storage address to the second terminal device. The second access module 124 is configured to access a predetermined magnetic disk based on the predetermined storage address, and obtain the stored resource data from the predetermined magnetic disk.

It should be noted that the sixth transmitting module 122 and the second access module 124 correspond to specific steps in the fourth embodiment. Examples and application scenarios of the modules are the same as those of the corresponding steps, but are not limited to the content disclosed in the fourth embodiment. It should be noted that the modules as a part of the apparatus may operate in the computer terminal 10 according to the fourth embodiment, and may be implemented by software or by hardware.

Preferably, in the solution according to the fifth embodiment of the present disclosure, the address of the predetermined magnetic disk may be transmitted to the second terminal device in one or more of the following transmission: a network communication, a Bluetooth® communication, a near field communication payment and a short message.

It can be seen from the above that the solution realized by the above device embodiments of the present disclosure may be applied to the following application scenarios, which can achieve effective and efficient interaction between terminals.

In a first application, when an APP on a first mobile terminal reaches a stage, a user A may, with the above solution, instantly switch the APP to the second mobile terminal, such as a mobile phone, of a user B, to continue to operate the scenario of the APP from the scenario on the first mobile terminal before switching, thereby taking over an APP on a terminal by the same APP on another terminal.

In a second application, a graphics application APP migration technology is applied to a social game. Specifically, when a user A of a first mobile terminal runs a game APP to a game level, a user B of a second terminal device, such as a mobile phone, may join the game application of the user A of the first mobile terminal instantly with the solution, so that the scenario of the game may continue from the scenario before the time of switching.

Specifically, in an optional solution, a game level of a user A may be taken over to continue the game.

According to another embodiment of the present disclosure, after loading the resource data, the second terminal device creates a new object in the application, such that the second terminal device and the first terminal device run the application in the first state synchronously. The created new object is controlled by the user of the second terminal device.

In an optional solution, the game can be shared between the two terminals. That is, the second terminal device can not only continue the game of a user B of the first mobile terminal but also feedback a game resource of a user B to the user A in the same manner, thereby playing the game by two game users together. In this way, the user A and the user B can play against each other in a game.

In a third application, the graphics application APP migration technology may also be applied to home devices. Specifically, in a case that a user A of a first mobile terminal experiences an application, such as a game, on a mobile phone, and then wants to switch to a PC machine in the house or a television in the house to continue the game, migration can be completed instantly with the above solution according to the present disclosure.

Sixth Embodiment

A system embodiment for implementing the above device embodiment is further provided according to an embodiment of the present disclosure. The device according to the embodiment of the present disclosure may operate in a computer terminal.

As shown in FIG. 12, the system for migrating application data between terminals according to the present disclosure may include a first terminal device 90 and a second terminal device 91.

The first terminal device 90 is configured to run an application, and obtain resource data of a first state of the application running on the first terminal device, where the first state is a state of the application during a period from startup to an instant when a migration instruction is received; store the resource data at a predetermined storage address, and transmit the storage address of the resource data to a second terminal device. The second terminal device 91 is configured with the application and has a communication relation with the first terminal device, and is configured to obtain the resource data by accessing the storage address of the resource data and load the resource data.

It can be seen from the above that in the solution according to the sixth embodiment of the present disclosure, the first terminal device is configured to run the application. The second terminal device has the communication relation with the first terminal device and is configured to transmit a migration request to the first terminal device and load the resource data on the first terminal device to its local application, in the process of running the application on the first terminal device. After the migration request is confirmed by the first terminal device, the resource data of operation of the application during a period from starting the application to an instant when the migration request is received is stored at a predetermined path. After the migration request is confirmed by the first terminal device, the storage address of the resource data is transmitted to the second terminal device, such that the second terminal device obtains the resource data. With the above solution, resource data of an application running on a terminal device of a user may be transmitted to a terminal device of a friend of the user, and the terminal device of the friend of the user may run the application based on the above resource data. In this way, the application is shared, and a technical problem in the conventional technology that the efficiency of collaboration between terminal devices is poor when sharing application resources between the terminal devices is solved.

It should be noted that the application in the system embodiment is not limited to a game-type application such as Super Mario™ or Plane Wars. The first terminal device or the second terminal device is not limited to an intelligent terminal device such as a smart phone or a tablet computer. In the process of running the application on the first terminal device, the second terminal device may transmit the migration request to the first terminal device, such that the first terminal device and the second terminal device have the migration relation.

Furthermore, it should be noted that after receiving the migration request transmitted by the second terminal device, the first terminal device in the system embodiment may obtain the resource data of operation of the application during a period from starting the application by the first terminal device to an instant when the migration request is received in response to the migration request. The resource data may be scenario data of the application during a period from startup to an instant when the migration request is received by the first terminal.

Furthermore, it should be noted that after obtaining the resource data of the application, the second terminal device may load the resource data to its local application. That is, the second terminal runs the same application as the first terminal device.

In an optional solution, before the obtaining the resource data of operation of the application during a period from an instant when the first terminal device starts the application to an instant when the migration request is received is performed by the system, the first terminal device may receive a breakpoint instruction generated by an application kernel module in a case that it is detected that the migration request is confirmed by the first terminal device. The terminal device suspends the application in response to the breakpoint instruction and performs the step of obtaining the resource data of operation of the application during a period from an instant when the first terminal device starts the application to an instant when the migration request is received.

It should be noted that the breakpoint instruction in the system embodiment of the present disclosure may be an instruction generated by the application kernel module in a background of the first terminal device in response to the migration request after the migration request is received by the first terminal device. Specifically, the application kernel module provides a port for generating the breakpoint instruction. After the migration request is received, the breakpoint instruction is generated by invoking a breakpoint function in a database LIB via the port, and the breakpoint instruction is returned to the first terminal device.

Furthermore, it should be noted that in the system embodiment of the present disclosure, after the breakpoint instruction generated by the application kernel module is received by the first terminal device, the breakpoint instruction controls the first terminal device to suspend the currently running application. The suspending time is an instant when the migration request transmitted by the second terminal device is received by the first terminal device. That is, the background is informed that resource data to be synchronized to the second terminal device is the resource data on the first terminal device during a period from starting the application to an instant when the migration request is received. The resource data described herein at least includes: an operating environment, function names of various functions for running the application and names and content of various objects for running the application. The resource data ensures that scenarios and content on the second terminal device are exactly the same as those on the first terminal device after the resource data is loaded by the second terminal.

In an optional solution, in the system embodiment, after the resource data is obtained, a restart instruction may be transmitted to the second terminal device via the application kernel module. The second terminal device obtains the restart instruction via a restart interface provided by the application kernel module. Then, the second terminal device starts the application which is loaded with the resource data, in response to the restart instruction, such that the second terminal device and the first terminal device run the application synchronously from an instant when the migration request is received.

It should be noted that in the system embodiment of the present disclosure, the restart instruction may be an instruction provided by an application kernel module in a background of the second terminal device after the resource data is obtained by the second terminal device from the predetermined magnetic disk. The restart instruction is used to control the second terminal device to start the application and load the obtained resource data to the currently running application. Specifically, the application kernel module provides a port for generating the restart instruction. After a restart instruction is received, the restart instruction is generated by invoking a restart function and a load function in a database LIB via the port.

In an optional solution, after the second terminal device having the migration relation with the first terminal device is determined, the system may transmit the address of the predetermined magnetic disk to the second terminal device. Then the second terminal device accesses the predetermined magnetic disk based on the address of the predetermined magnetic disk, and obtains the stored resource data from the predetermined magnetic disk.

Preferably, the system may transmit the address of the predetermined magnetic disk to the second terminal device in at least one of the following transmission: a network communication, a Bluetooth® communication, a near field communication payment and a short message. For example, in a case that a WIFI communication is adopted, the first terminal device may obtain an access address of the second terminal device by querying via WIFI, and transmit the address of the predetermined magnetic disk for storing the resource data to the second terminal device based on the access address of the second terminal device.

Seventh Embodiment

A storage medium is further provided according to an embodiment of the present disclosure. Optionally, in the embodiment, the storage medium may be configured to store program codes for implementing the method for migrating application data between terminals according to the first embodiment.

Optionally, in the embodiment, the storage medium may be located in any server of a group of computer terminals in a computer network.

Optionally, in the embodiment, the storage medium is configured to store program codes for performing the following steps S20 to S27.

In step S20, an application is run on a first terminal device.

In step S22, a migration instruction is received by the first terminal device, and resource data of a first state of the application running on the first terminal device is obtained. The first state is a state of the application during a period from startup to an instant when the migration instruction is received.

In step S24, the resource data is stored at a predetermined storage address.

In step S26, a second terminal device is determined as a destination for migration of the resource data, where the second terminal device is configured with the application.

In step S17, the storage address of the resource data is transmitted to the second terminal device, where the second terminal device obtains the resource data by accessing the storage address and loads the resource data.

Optionally, the storage medium is further configured to store program codes for performing the following steps: the first terminal device receives the migration instruction at the first instant, and forwards the migration instruction to an application kernel module; the first terminal device receives a breakpoint instruction generated by the application kernel module in response to the migration instruction; and the first terminal device suspends the application in response to the breakpoint instruction and obtains the resource data of the first state of the application.

Optionally, the storage medium is further configured to store program codes for performing the following steps: the application kernel module transmits a restart instruction to the second terminal device via a restart interface, where the restart interface is provided by the application kernel module; and the second terminal device starts the application in response to the restart instruction, such that the second terminal device and the first terminal device run the application in the first state synchronously.

Optionally, the storage medium is further configured to store program codes for performing the following steps: the predetermined storage address of the resource data is transmitted to the second terminal device; and the second terminal device accesses a predetermined magnetic disk based on the address of the predetermined magnetic disk, and obtains the stored resource data from the predetermined magnetic disk.

Optionally, the storage medium is further configured to store program codes for performing the following steps: the address of the predetermined magnetic disk is transmitted to the second terminal device in one or more of the following transmission: a network communication, a Bluetooth® communication, a near field communication payment and a short message.

Optionally, in the embodiment, the storage medium may include but not limited to a medium that can store program codes, such as a USB flash disk, a Read-Only Memory (ROM), a Random Access Memory (RAM), a mobile hard disk, a magnetic disk or an optical disk.

Optionally, for specific examples of the embodiment, reference can be made to examples described in the first embodiment, the second embodiment and the third embodiment, which are not described herein.

Eighth Embodiment

A storage medium is further provided according to an embodiment of the present disclosure. Optionally, in the embodiment, the storage medium may be configured to store program codes for implementing the method for migrating application data between terminals according to the first embodiment.

In an embodiment, the storage medium may be located in any server of a group of computer terminals in a computer network.

In an embodiment, the storage medium is configured to store program codes for performing the following steps S120 to S128.

In step S120, in the process of running an application on a first terminal device, a second terminal device transmits a migration request to the first terminal device to establish a migration relation between the first terminal device and the second terminal device.

In step S122, after confirming the migration request, the first terminal device obtains resource data of a first state of the application running on the first terminal device, where the first state is a state of the application during a period from startup to an instant when a migration instruction is received.

In step S124, the first terminal device stores the resource data at a predetermined storage address.

In step S126, after confirming the migration request, the first terminal device transmits the storage address of the resource data to the second terminal device.

In step S128, the second terminal device obtains the resource data of the application by accessing the storage address and loads the resource data.

In an embodiment, the storage medium is further configured to store program codes for performing the following steps: the first terminal device receives the migration instruction at a first instant, and forwards the migration instruction to an application kernel module; the first terminal device receives a breakpoint instruction generated by the application kernel module in response to the migration instruction; and the first terminal device suspends the application in response to the breakpoint instruction and obtains the resource data of the first state of the application.

In an embodiment, the storage medium is further configured to store program codes for performing the following steps: the application kernel module transmits a restart instruction to the second terminal device, where the second terminal device obtains the restart instruction via a restart interface provided by the application kernel module; and the second terminal device starts the application in response to the restart instruction, such that the second terminal device and the first terminal device run the application in the first state synchronously.

In an embodiment, the storage medium is further configured to store program codes for performing the steps of transmitting the address of the predetermined magnetic disk to the second terminal device in one or more of the following transmission: a network communication, a Bluetooth® communication, a near field communication payment and a short message.

In the embodiment, the storage medium may include but not limited to a medium that can store program codes, such as a USB flash disk, a Read-Only Memory (ROM), a Random Access Memory (RAM), a mobile hard disk, a magnetic disk or an optical disk.

Optionally, for specific examples of the embodiment, reference can be made to examples described in the fourth embodiment, the fifth embodiment and the seventh embodiment, which are not described herein.

The sequence numbers of the above embodiments of the present disclosure are used for description only, and do not represent quality of the embodiments.

If the integrated unit in the above embodiments is implemented in software functional unit and is sold or used as a separate product, it may be stored in a computer readable storage medium. Based on this understanding, the essence of the technical solutions, the part of the technical solutions which contributes to the conventional technology, or, all or part of the technical solutions of the present disclosure may be implemented in a form of software product, which is stored in a storage medium and includes several instructions to control one or more computer devices (which may be personal computers, servers or network devices, etc.) to execute all or some of the steps in the methods according to the embodiments of the present disclosure.

In the above embodiments, descriptions of various embodiments have their own focuses. Reference can be made to related descriptions in other embodiments for a section which is not described in detail in an embodiment.

It should be understood that the disclosed client apparatus according to some embodiments of the present disclosure may be implemented in other ways. The device embodiments described above are illustrative only. For example, the units are divided merely in logical function, which may be divided by another way in actual implementation. For example, multiple units or components may be combined or integrated into another system, or some features may be ignored or not performed. In addition, the disclosed or discussed mutual coupling or direct coupling or communication connection may be an indirect coupling or communication connection through some interfaces, units or modules, which may be implemented in electrical or other forms.

The units described as separated components may or may not be physically separated. A component displayed as a unit may or may not be a physical unit, which may be located in one position or distributed on multiple network units. A part or all of the components may be selected to achieve the object of solutions in the embodiments based on practical requirements.

In addition, the functional units in the embodiments of the present disclosure may be integrated into a process unit or physically separated, or two or more units may be integrated into a unit. The integrated unit described above may be implemented in hardware or in software functional unit.

The above are only preferred embodiments of the present disclosure. It should be noted that, for those skilled in the art, changes and modifications can be made without departing from the principle of the present disclosure, and the changes and modifications should be considered within the protection scope of the present disclosure.

The invention claimed is:

1. A method for migrating application data between terminals, comprising:
running a game application on a first terminal device;
receiving, by the first terminal device, a migration instruction;
obtaining, by the first terminal device, resource data of a first state of the game application running on the first terminal device in response to the migration instruction, wherein the first state comprises a state of the game application during a period from startup of the game application to an instant when the migration instruction is received;
storing the resource data at a predetermined storage address;
determining a second terminal device as a destination for migration of the resource data, wherein the second terminal device is configured with the game application; and
transmitting an instruction to the second terminal device, the instruction configured to cause the second terminal device to:
restart the game application on the second terminal device,
access the resource data based on the storage address,
load the resource data to recover the first state of the game application, and
create a new object in the game application, wherein the first terminal device and the second terminal device execute the game application starting at the first state synchronously, wherein the first terminal device controls movement of an original object to play the game application with the first terminal device and the second terminal device controls movement of the created new object to play the game application with the second terminal device.

2. The method according to claim 1, wherein obtaining resource data of the first state of the game application running on the first terminal device further comprises:
receiving, by the first terminal device, the migration instruction at a first instant, and forwarding, by the first terminal device, the migration instruction to an application kernel;
receiving, by the first terminal device, a breakpoint instruction generated by the application kernel in response to the migration instruction;
suspending, by the first terminal device, the game application in response to the breakpoint instruction; and
obtaining, by the first terminal device, the resource data of the first state of the game application.

3. The method according to claim 1, wherein the resource data comprises: an operating environment of the game application, a function name of a function for running the game application, and a name and content of an object for running the game application.

4. The method according to claim 1, wherein the migration instruction is transmitted by the second terminal device to the first terminal device.

5. The method according to claim 1, wherein the storage address of the resource data is transmitted to the second terminal device in one or more of the following: a network communication, a Bluetooth communication, a near field communication and a short message.

6. The method according to claim 3, wherein after the second terminal device obtains the resource data by accessing the storage address, the method further comprises:
transmitting, by an application kernel, the instruction to the second terminal device via a restart interface, wherein the restart interface is provided by the application kernel; and
starting, by the second terminal device, the game application in response to the instruction and loading, by the second terminal device, the resource data, such that the second terminal device and the first terminal device run the game application in the first state synchronously.

7. An apparatus for migrating application data between terminals, applied to a first terminal device, comprising:
a processor and
a memory accessible to the processor, the processor configured to:
run a game application on the first terminal device;
receive a migration instruction;
obtain resource data of a first state of the game application running on the first terminal device in response to the migration instruction, wherein the first state comprises a state of the game application during a period from startup of the game application to an instant when the migration instruction is received;
store the resource data at a predetermined storage address;
determine a second terminal device as a destination for migration of the resource data, wherein the second terminal device is configured with the game application; and
transmit an instruction to the second terminal device, the instruction configured to cause the second terminal device to:
restart the game application on the second terminal device,
access the resource data from the memory based on the storage address,
load the resource data to recover the first state of the game application, and
create a new object in the game application, wherein the first terminal device and the second terminal device execute the game application starting at the first state synchronously, wherein the first terminal device controls movement of an original object to play the game application with the first terminal device and the second terminal device controls movement of the created new object to play the game application with the second terminal device.

8. The apparatus according to claim 7, wherein the processor is further configured to:

receive the migration instruction at a first instant and forward the migration instruction to an application kernel;

receive by the first terminal device a breakpoint instruction generated by the application kernel in response to the migration instruction; and suspend the game application in response to the breakpoint instruction and obtain the resource data of the first state of the game application.

9. The apparatus according to claim 7, wherein the resource data comprises: an operating environment of the game application, a function name of a function for running the game application, and a name and content of an object for running the game application.

10. The apparatus according to claim 7, wherein the migration instruction is transmitted by the second terminal device to the first terminal device.

11. The apparatus according to claim 7, wherein the storage address of the resource data is transmitted to the second terminal device in one or more of the following: a network communication, a Bluetooth communication, a near field communication and a short message.

12. A non-transitory computer storage medium comprising:

a plurality of computer executable instructions executable by a processor to:

cause execution of a game application on a first terminal device;

receive a migration instruction;

obtain resource data of a first state of the game application running on the first terminal device in response to the migration instruction, wherein the first state is a state of the game application during a period from startup of the (lame application to an instant when the migration instruction is received;

store the resource data at a predetermined storage address;

determine a second terminal device as a destination for migration of the resource data, wherein the second terminal device is configured with the game application; and transmit an instruction to the second terminal device, the instruction configured to cause the second terminal device to:

restart the game application on the second terminal device, access the resource data based on the predetermined storage address, load the resource data to recover the first state of the game application, and create a new object in the game application, wherein the first terminal device and the second terminal device execute the game application starting at the first state synchronously, wherein the first terminal device controls movement of an original object for playing the game application on the first terminal device and the second terminal device controls movement of the created new object for playing the game application on the second terminal device.

13. The non-transitory computer storage medium according to claim 12, wherein the computer executable instructions are further executable by the processor to:

receive the migration instruction at a first instant;

forward the migration instruction to an application kernel;

receive a breakpoint instruction generated by the application kernel in response to the migration instruction; and suspend the game application in response to the breakpoint instruction, and obtaining, by the first terminal device, the resource data of the first state of the game application.

14. The non-transitory computer storage medium according to claim 12, wherein the resource data comprises: an operating environment of the game application, a function name of a function for running the game application, and a name and content of an object for running the game application.

15. The non-transitory computer storage medium according to claim 12, wherein the migration instruction is received from the second terminal device.

16. The non-transitory computer storage medium according to claim 12, wherein the storage address of the resource data is transmitted to the second terminal device in one or more of the following: a network communication, a Bluetooth communication, a near field communication and a short message.

17. The non-transitory computer storage medium according to claim 14, wherein the computer executable instructions are further executable by the processor to:

transmit, by an application kernel, after the second terminal device obtains the resource data by accessing the storage address, the instruction to the second terminal device via a restart interface, wherein the restart interface is provided by the application kernel.

* * * * *